US 11,816,391 B2
Nov. 14, 2023

(12) United States Patent
Risher

(54) FADE DEVICE

(71) Applicant: Vaughan Risher, Jackson, MS (US)

(72) Inventor: Vaughan Risher, Jackson, MS (US)

(*) Notice: Subject to any disclaimer, the term of this patent is extended or adjusted under 35 U.S.C. 154(b) by 249 days.

(21) Appl. No.: 17/140,102

(22) Filed: Jan. 3, 2021

(65) Prior Publication Data

US 2021/0208840 A1 Jul. 8, 2021

Related U.S. Application Data

(60) Provisional application No. 62/957,188, filed on Jan. 4, 2020.

(51) Int. Cl.
| | |
|---|---|
| *G06F 3/16* | (2006.01) |
| *G10H 1/00* | (2006.01) |
| *H04H 60/04* | (2008.01) |
| *G10H 1/46* | (2006.01) |
| *H01H 3/00* | (2006.01) |

(52) U.S. Cl.
CPC ........... *G06F 3/165* (2013.01); *G10H 1/0066* (2013.01); *G10H 1/46* (2013.01); *G10H 2220/311* (2013.01); *G10H 2240/325* (2013.01); *H01H 2003/008* (2013.01); *H04H 60/04* (2013.01)

(58) Field of Classification Search
CPC .......... G06F 3/165; G10H 1/0066; G10H 2240/325; G10H 1/46; G10H 2220/311; H04H 60/04; H01H 2003/008
See application file for complete search history.

(56) References Cited

U.S. PATENT DOCUMENTS

| 5,350,882 A * | 9/1994 | Koguchi | G10H 1/02 |
| | | | 84/612 |
| 6,889,193 B2 | 5/2005 | McLean | |
| 7,684,573 B2 | 3/2010 | Makino et al. | |
| 8,473,084 B2 | 6/2013 | Lindahl et al. | |
| 2001/0055401 A1* | 12/2001 | Yamada | G11B 27/34 |
| 2002/0136419 A1* | 9/2002 | Santos | H04H 60/04 |
| | | | 381/119 |
| 2003/0007675 A1* | 1/2003 | Schmidt | A61B 6/032 |
| | | | 382/132 |
| 2005/0055117 A1* | 3/2005 | Holton | H04H 60/04 |
| | | | 381/119 |
| 2008/0013757 A1* | 1/2008 | Carrier | G11B 27/034 |
| | | | 381/119 |
| 2008/0310142 A1* | 12/2008 | Huber | G11B 27/038 |
| | | | 362/85 |
| 2010/0014390 A1* | 1/2010 | Flum | G11B 27/105 |
| | | | 369/4 |
| 2010/0179674 A1* | 7/2010 | Willard | G10H 1/0025 |
| | | | 715/771 |
| 2010/0230179 A1* | 9/2010 | Uchiyama | G11B 27/005 |
| | | | 381/109 |
| 2012/0053710 A1 | 3/2012 | Lindahl et al. | |

(Continued)

FOREIGN PATENT DOCUMENTS

JP 2012034154 A * 2/2012

*Primary Examiner* — Carolyn R Edwards
*Assistant Examiner* — Kuassi A Ganmavo
(74) *Attorney, Agent, or Firm* — Paul D. Chancellor; Ocean Law

(57) ABSTRACT

A fade device includes a processor that couples a crossfader to a mixer, the processor using crossfader input to apply an acceleration or a latency to an audio signal passing through a mixer.

16 Claims, 38 Drawing Sheets

(56) References Cited

U.S. PATENT DOCUMENTS

| | | | | |
|---|---|---|---|---|
| 2013/0266155 | A1* | 10/2013 | Mashita | H04R 3/00 381/119 |
| 2016/0070275 | A1* | 3/2016 | Anderson | H04H 60/04 700/275 |
| 2016/0189699 | A1* | 6/2016 | Garet | G05G 1/10 345/184 |
| 2019/0296843 | A1* | 9/2019 | Jeffs | H04H 60/58 |

* cited by examiner

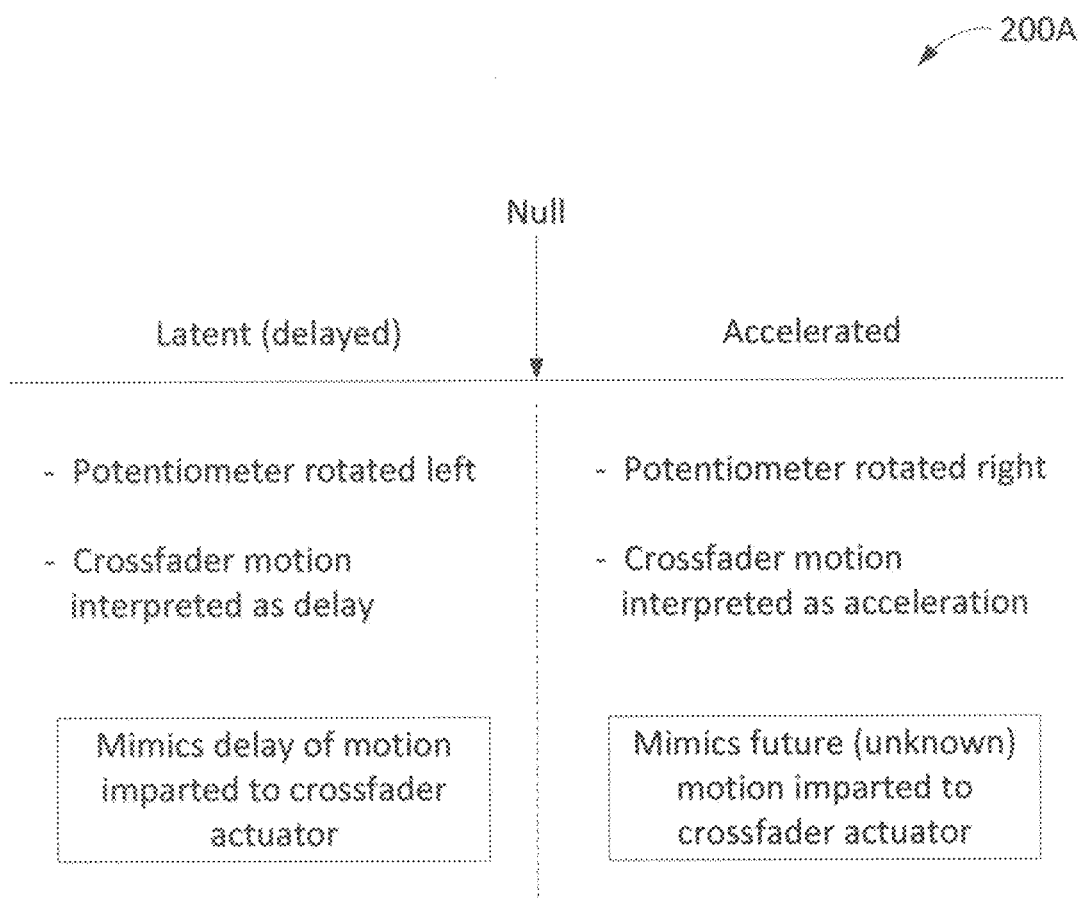

FADE DEVICE MOTION BUFFERS

FIG. 5B
FADE DEVICE BUTTON MODIFIERS (HOLD and FINE affect MAIN MOTION BUFFER. Capture records MAIN MOTION BUFFER.)

HOLD

HOLD BUTTON is pressed
crossfader motion is not recorded

HOLD BUTTON is released
crossfader motion resumes recording

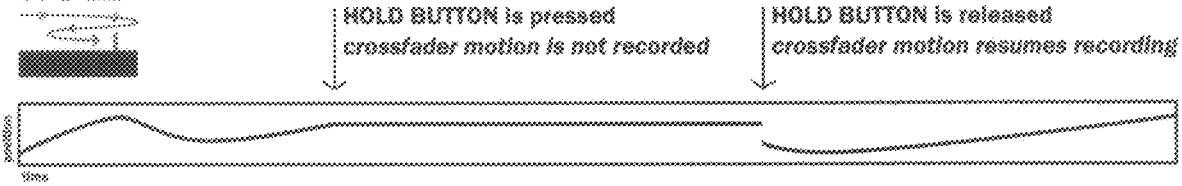

FINE

FINE BUTTON is pressed
crossfader motion is measured
in more detail

FINE BUTTON is released
crossfader motion resumes normal
detail

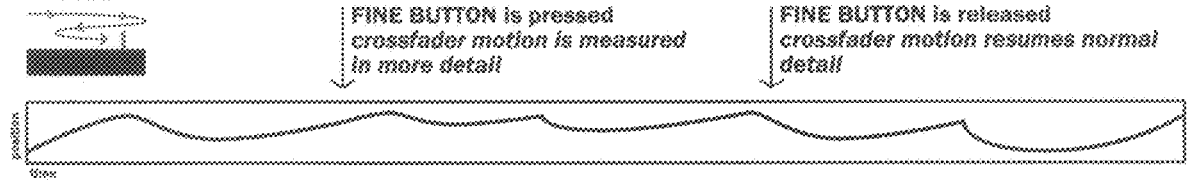

CAPTURE (MOTION)

CAPTURE BUTTON is pressed
crossfader motion from main motion buffer
is recorded in special CAPTURE BUFFER

FIRE (MOTION)

FIRE BUTTON is pressed
CAPTURE BUFFER recorded crossfader motion
is replayed

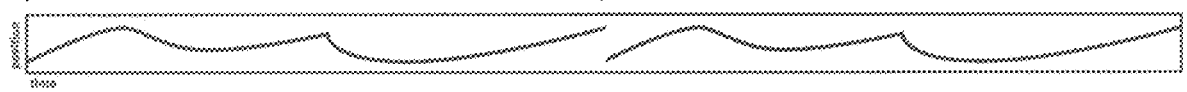

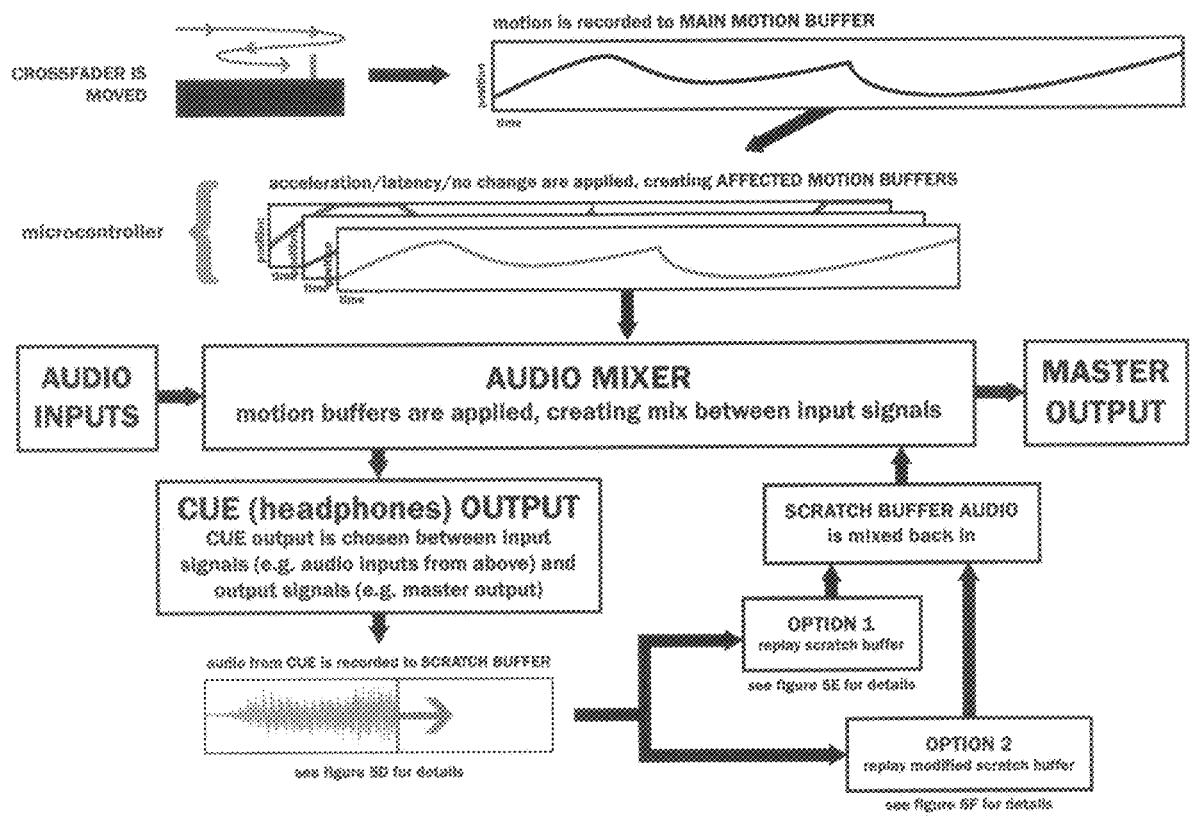

FADE DEVICE AUDIO SAMPLE RECORDING FUNCTIONALITY

SELECTED CUE OUTPUT IS
SOURCE FOR AUDIO SAMPLING
(see FIG. 11)

SHIFT + CAPTURE (AUDIO)

SHIFT + CAPTURE BUTTONS are pressed
selected cue output audio is recorded in sample audio buffer (the "SCRATCH BUFFER")

recording audio in progress

FADE DEVICE SAMPLE PLAYBACK FUNCTIONALITY
OPTION 1

FADE DEVICE SAMPLE PLAYBACK FUNCTIONALITY
OPTION 2

FADE DEVICE motion buffer is the reference for playhead position in SCRATCH BUFFER

SHIFT + FIRE (AUDIO)

SHIFT + FIRE BUTTONS are pressed and held
SCRATCH BUFFER audio is replayed as modified by motion of the AFFECTED MOTION BUFFER.
(the scratch buffer playhead tracks affected motion buffer position)

STEPS TO PERFORM A "ONE HAND SCRATCH" (example 1)

1     HOLD SHIFT + FIRE to initiate SCRATCH BUFFER PLAYBACK option 2

2     move the fader slowly to create a slow "SCRATCH" sound     OR     move the fader slowly and apply acceleration to create a fast "SCRATCH" sound

3     apply ACCELERATION to the CROSSFADER MOTION BUFFER to create a matching rhythmic cut

STEPS TO PERFORM A "ONE HAND SCRATCH" (example 2)

1 HOLD SHIFT + FIRE to initiate SCRATCH BUFFER PLAYBACK option 2

2 move the fader fast to create a fast "SCRATCH" sound     apply latency to the chosen AFFECTED MOTION BUFFER to time the "SCRATCH" sound

AND

3 apply ACCELERATION or LATENCY to the CROSSFADER MOTION BUFFER to create a matching rhythmic cut

FIG. 5I
FADE DEVICE MIDI/EFFECTS EXPANDER

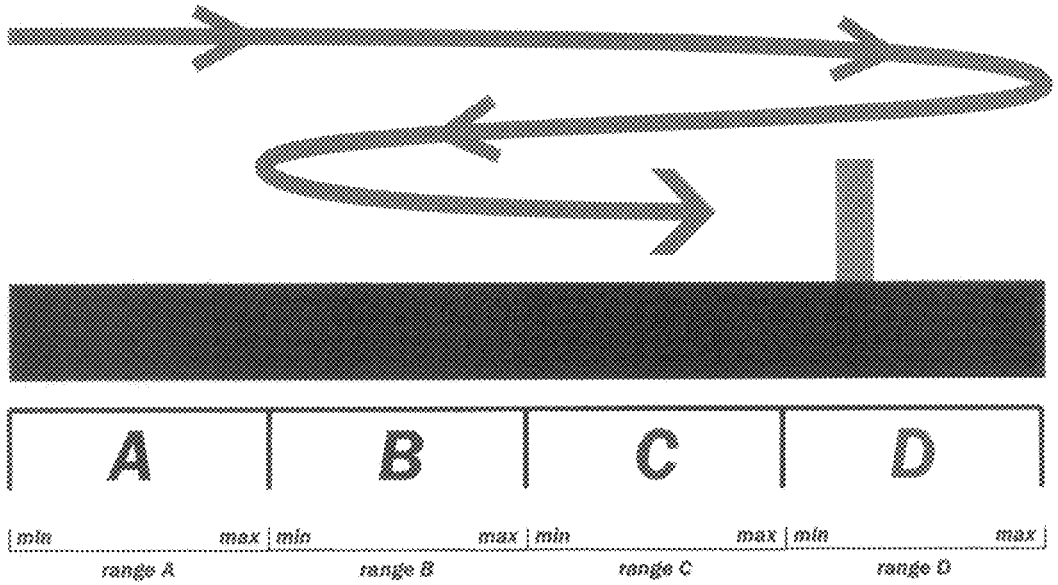

(each range corresponds to a specific effect internal to FADE DEVICE or a MIDI Channel and Control Change Number intended to control an external device)

Ex. What happens as crossfader moves left to right from range A to D:

parameter A starts at min and increases to max → parameter A reverts to default value parameter B starts at min and increases to max → parameter B reverts to default value parameter C starts at min and increases to max → parameter C reverts to default value parameter D starts at min and increases to max ex. D is Active

WHEN EXPAND BUTTON PRESSED
The active range (A, B, C, D) takes over full range of the crossfader

|min _____ max|

In this example, control of parameter D takes over the full range of crossfader

EXPAND BUTTON FUNCTIONALITY CAN BE REVERSED
If so, "full range" is the default and expand must be pressed for letter ranges to be activated.

FADE DEVICE

PRIORITY CLAIM

This application claims priority to U.S. Prov. Pat. App. No. 62/957,188 filed Jan. 4, 2020 and titled FADE DEVICE.

INCORPORATION BY REFERENCE

U.S. Pat. Nos. 8,473,084, 7,684,573 and 6,889,193 are by this reference incorporated herein in their entireties and for all purposes.

BACKGROUND OF THE INVENTION

Field of the Invention

The present invention relates to an article of manufacture for modifying electrical and/or audio signals. In particular, signals are mixed and modified by a fade device to provide a resulting signal.

Discussion of the Related Art

Some fade devices used to process musical signals are known. For example, these include fade-in, fade-out devices used to introduce a signal or to decay a signal. Fade devices may also process two signals simultaneously. For example, they may decay a first signal while introducing a second signal. These devices are typically known as "cross-faders."

SUMMARY OF THE INVENTION

In the present invention, a fade device is coupled to a mixer via a processor such a digital processor. In an exemplary embodiment, a crossfader is coupled to a mixer via microprocessor. And, in some embodiments, microprocessor outputs modify the mixing of at least two signals and may modify operation of an effects processor through which a signal derived from the mixed signals passes.

In an embodiment a motion controlled fade device comprises: an audio block with at least two audio signal inputs and an audio signal output; a mixer in the audio block that is voltage controlled for processing signals derived from the two audio signal inputs; a crossfader with a slider control, slider motion for controlling the crossfader; the mixer and the crossfader coupled together via a processor; processor inputs including one or more inputs from corresponding 360 degree rotary potentiometers; potentiometer rotation in a first direction for selecting audio signal processing with latency and potentiometer rotation in a second direction for selecting audio signal processing with acceleration; the processor for receiving crossfader signals indicative of multiple slider positions; the processor for constructing a first signal decay curve and a second signal introduction curve; information derived from the curves used to control the mixer; and, the audio signal output derived from a mixer output.

BRIEF DESCRIPTION OF THE DRAWINGS

The present invention is described with reference to the accompanying figures. These figures, incorporated herein and forming part of the specification, illustrate the invention and, together with the description, further serve to explain its principles enabling a person skilled in the relevant art to make and use the invention.

FIGS. 2A-C show latency and acceleration functions of the fade device.
FIGS. 5A-I show embodiments of buffers, controls, and functions associated with the fade device.

DETAILED DESCRIPTION OF THE PREFERRED EMBODIMENTS

The disclosure provided in the following pages describes examples of some embodiments of the invention. The designs, figures, and description are non-limiting examples of embodiments they disclose. For example, other embodiments of the disclosed device and/or method may or may not include the features described herein. Moreover, disclosed advantages and benefits may apply to only certain embodiments of the invention and should not be used to limit the disclosed invention.

To the extent parts, components and functions of the described invention exchange electric power or signals, the associated interconnections and couplings may be direct or indirect unless explicitly described as being limited to one or the other. Notably, parts that are connected or coupled may be indirectly connected and may have interposed devices including devices known to persons of ordinary skill in the art.

In this application, signal levels may be varied, for example varied by a potentiometer, optical device, encoder, or touch device for example a touch sensitive device using capacitance or inductance. These devices where suitable may be operated via rotary, linear, or curvilinear motion or touch. Where a signal level is varied, any of these devices may be used where appropriate. For example, when this specification mentions a particular device for varying signal level or indicating position, such as a potentiometer, other embodiments include any of those mentioned above (e.g., encoder).

Figure 1A:
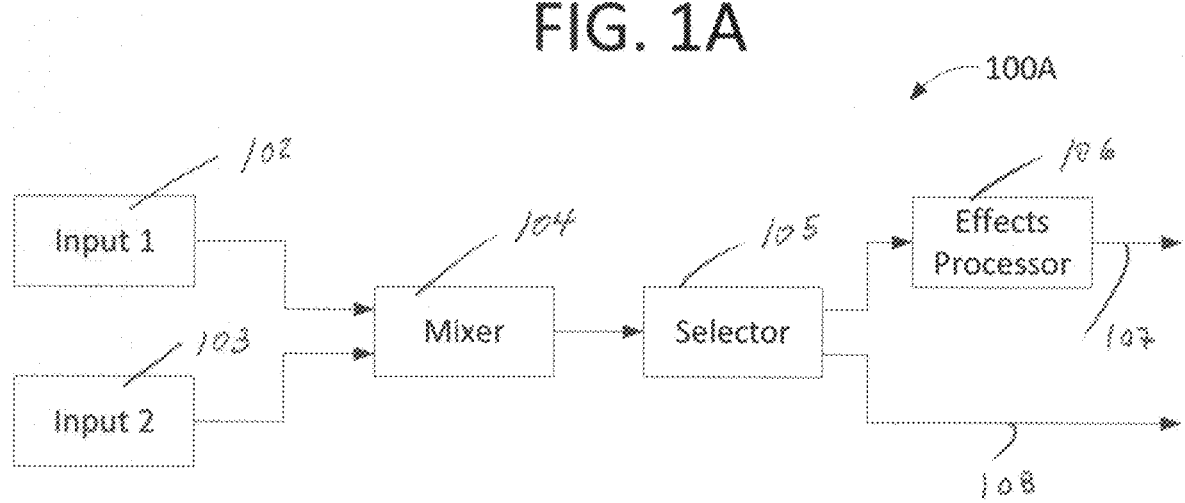
FIG. 1A shows a mixer in an audio block.

FIG. 1A shows an embodiment of the invention 100A. Here, input signals such a first input 102 and a second input 103 pass through a mixer 104 and produce an output 107, 108. In various embodiments, a selector 105 provides a signal derived from the mixer to an effects processor 106 with output 107 or provides a signal 108 as an output. Here, the mixer is a voltage controlled mixer. In other embodiments, where suitable, a voltage controlled, frequency controlled, level controlled, phase controlled, or another similar mixer may be used.

Figure 1B:
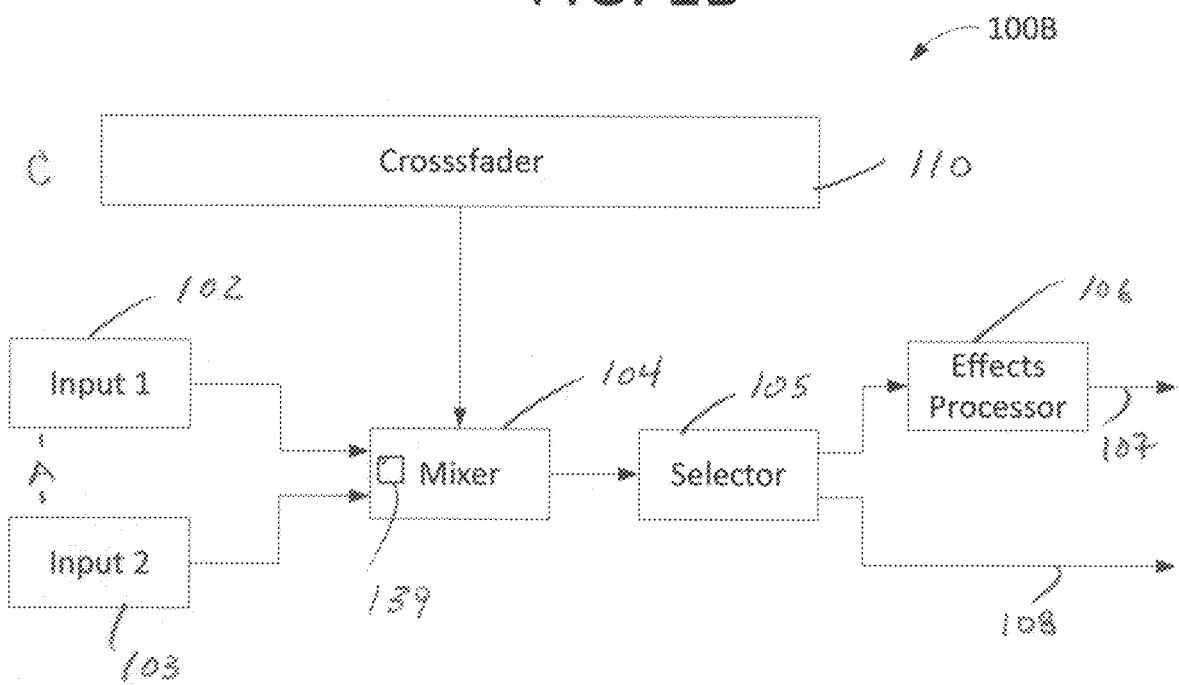
FIG. 1B shows a crossfader connected to a mixer of an audio block.

FIG. 1B shows an embodiment of the invention 100B. Here, a crossfader device 11 x0 in crossfader block C provides an output to a mixer 104 such as a voltage controlled mixer in an audio signal processing block A. The audio signal processing block includes input signals such a first input 102 and a second input 103 that pass through a mixer 104 and produce an output 107, 108. In various embodiments, a selector 105 provides a signal derived from the mixer to an effects processor 106 with output 107 or provides a signal 108 as an output. In various embodiments, the crossfader has a built-in position or linear position sensor, for example a sliding fader control.

The crossfader device may be any know crossfader that provides outputs capable of selecting levels of two or more signals. For example, the crossfader may utilize a selector or continuous selector whose position determines a first signal level from a first curve relating position to level and a second signal level from a second curve relating position to level. The crossfader may be actuated by a physical slider or rotary device. The crossfader may be actuated by a touch sensitive device emulating a physical device such as a slider or rotary device. In some embodiments the crossfader output determines a first signal level and a second signal level based on actuator and/or touch position. In some embodiments the crossfader actuator and/or touch position is a crossfader output.

Figure 1C:
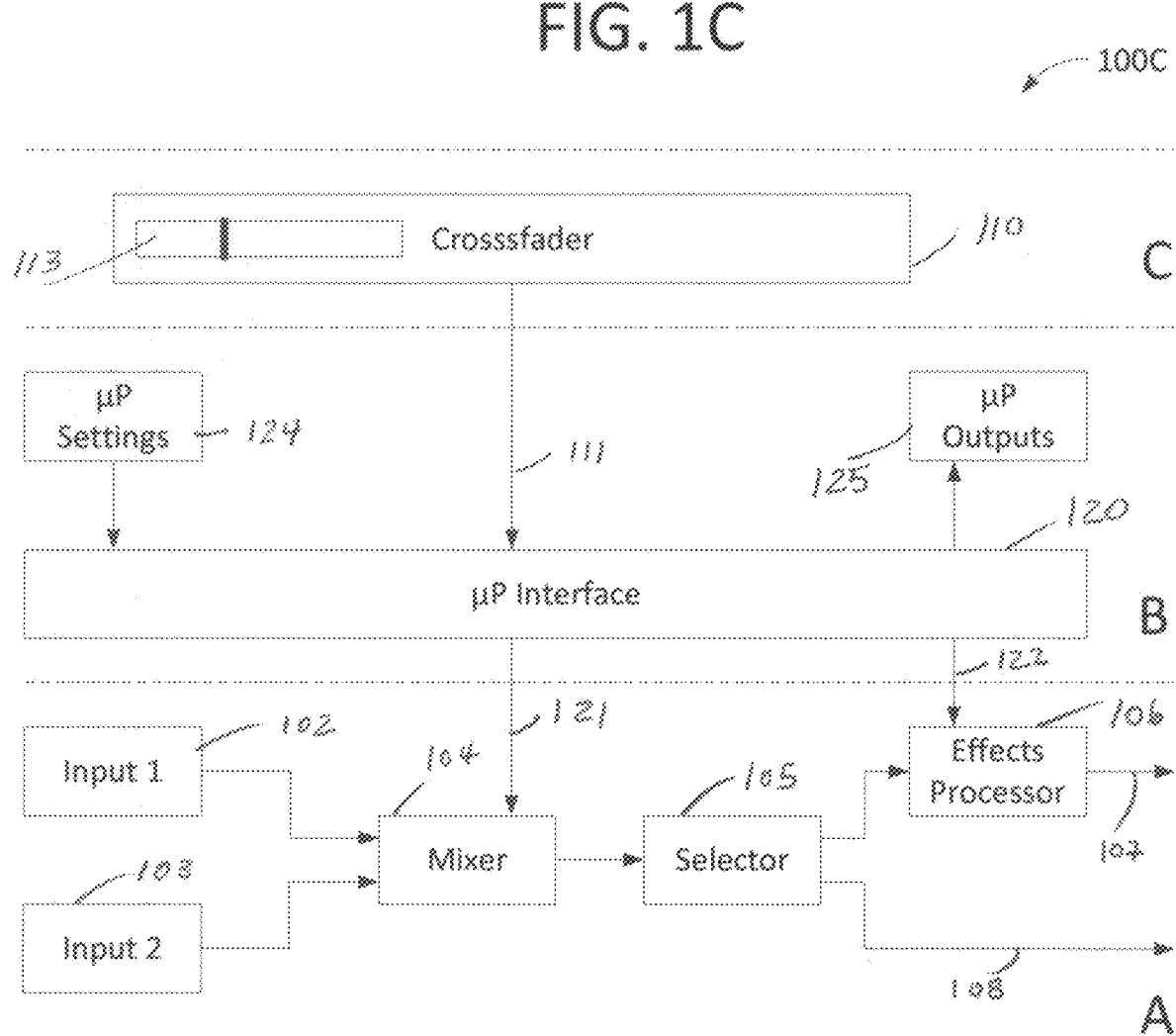
FIG. 1C shows a fade device of the present invention including a processor interposed between a crossfader and an audio block.

FIG. 1C shows another embodiment of the invention 100C. Here, a processor or microprocessor μP ("processor") block B is interposed between crossfader block A and audio signal processing block C. The crossfader 110 has an actuator such as a slider 113. The crossfader is connected to the microprocessor 120 via a crossfader output 111 and the microprocessor is connected to the mixer 104 via a microprocessor output 121. Note the microprocessor may create a set of PWM modulated digital signals which are made "analog" with RC filters (see https://www.allaboutcircuits-.com/technical-articles/low-pass-filter-a-pwm-signal-into-an-analog-voltage/ incorporated herein by reference). These analog voltage signals then control the Voltage Controlled Amplifiers 139 in the mixer 104 which create the mix between the stereo audio inputs.

Other processor inputs 124 may include inputs for user selectable settings and/or other settings 124. Other processor outputs 125 may include outputs for indicating status and data. In some embodiments the processor may include an output 122 to the effects processor 106.

The audio signal processing block includes input signals such as first input 102 and a second input 103 that pass through a mixer 104 and produce an output 107, 108. In various embodiments, a selector 105 provides a signal derived from the mixer to an effects processor 106 with output 107 or provides a signal 108 as an output.

Figure 1D:
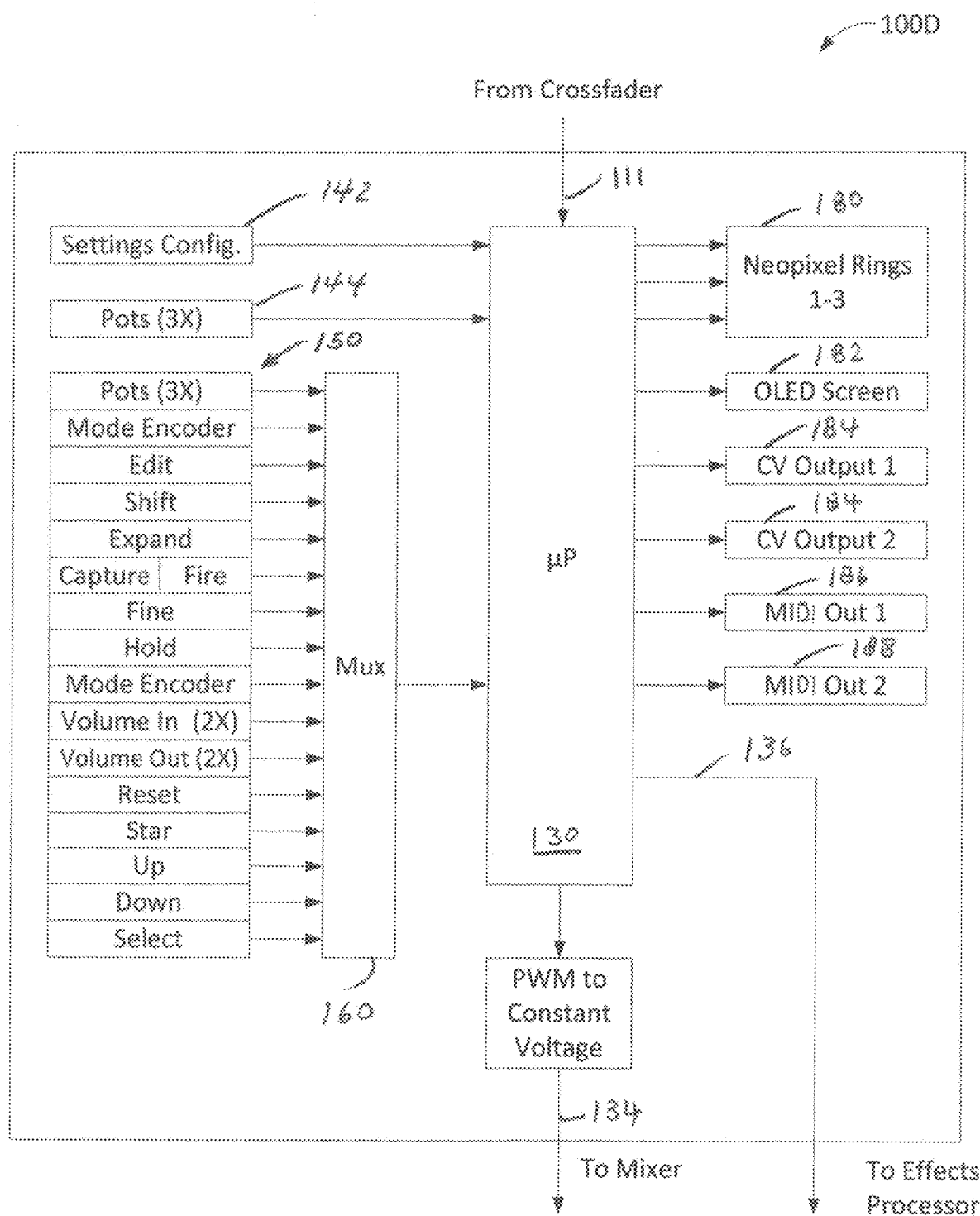
FIG. 1D shows inputs and outputs of a processor of the fade device.

FIG. 1D shows an embodiment of the processor and its connections 100D. Main processor connections may include an input from the crossfader 111 and an output 134 to the mixer. Some embodiments may include a PWM to constant voltage converter 132 to 134 between the processor and the mixer. Some embodiments may include an output 136 to an effects processor 106.

Pots 1-3 may be endless potentiometers with each pot also operable as a button when you depress the knob. Alternatively, some embodiments may include input and output volume knobs in addition to a set of four potentiometers or button potentiometers such as potentiometers rotatable from 0-100% with a stop or stops therebetween.

Other processor inputs, for example settings, may include a mode input or settings configurator (i.e., settings config) 142, one or more potentiometers (three shown) 144, and various buttons 150. Buttons may include plural potentiometer buttons (three shown), a mode input or mode encoder button, and edit button, a shift button, an expand button, a capture button, a fire button, a fine button, a hold button, a reset button, and a star button.

One or more of the potentiometers 144 may be any know potentiometer that provides or indicates level control. For example, the potentiometer may utilize a selector such as a 360 degree potentiometer whose position determines a signal level from a curve relating position to level. The potentiometer may be actuated by physical motion of the device. The potentiometer may be actuated by a touch sensitive device emulating a physical device such as a rotary device.

Other processor outputs, for example status and data outputs, may include output(s) for neopixel ring (three shown) 180, OLED screen 182, CV (control voltage) 184, MIDI Out 1 186, and MIDI out 2 188. Note that CV output 184 may be replaced by CV Out 1 and CV Out 2.

Signals passing from the crossfader 111 to the mixer 104 via the processor 120 are modified in the processor.

The architecture of the fader device disclosed in the figures above enables manipulation of the audio input signals 102, 103 according to various inputs including processor 130 inputs such as those shown in FIG. 1D ("processor inputs"). For example, these manipulations may apply one or more of latency, acceleration, and quantization to the input signals. For example, latency and acceleration may be applied for controlling the gain of audio input signals. The figures below including FIGS. 2A-E, 3A-B, 4A-B describe acceleration and latency features of some embodiments of the present invention.

FIG. 2A provides an overview of one embodiment of the latency and acceleration features 200. Latent response is shown as a variable to the left of the variable acceleration with a null point in between. Latent response can be understood as playback that is delayed or a mimic of motion imparted to the crossfader actuator that is delayed. Alternatively, accelerated response can be understood as a prediction of future play or a mimic of future motion imparted to the crossfader actuator.

For example, turning a potentiometer or selector 144 to the left or counterclockwise may indicate or provide a setting that indicates latent playback. After the potentiometer or selector is set for latency, the crossfader 110 will interpret its actuator or slider motion as a delay. These actions will mimic a delay of the motion that is actually imparted to the crossfader actuator 113.

Turning a potentiometer or selector 144 to the right or clockwise may indicate or provide a setting that indicates "accelerated" playback. After the potentiometer or selector is set to accelerate playback, the fade device may mimic a prediction of future (unknown) motion as if this crossfader actuator 113 motion had actually taken place.

In an embodiment, prior crossfader slider 113 motion may be used predict or indicate future crossfader slider motion. For example, this future motion may be based on a second derivative (acceleration) of slider position versus time. For example, this future motion may be based on a third derivative (jerk) of slider position versus time. This future motion may be adjusted with a level device or rotary device such as a rotary encoder(s) or potentiometer(s) 144.

In an embodiment, a latency algorithm provides a crossfader slider motion indication that is delayed with respect to the actual crossfader slider motion. The amount of latency can be adjusted with a fade device potentiometer 144.

Figure 2B:
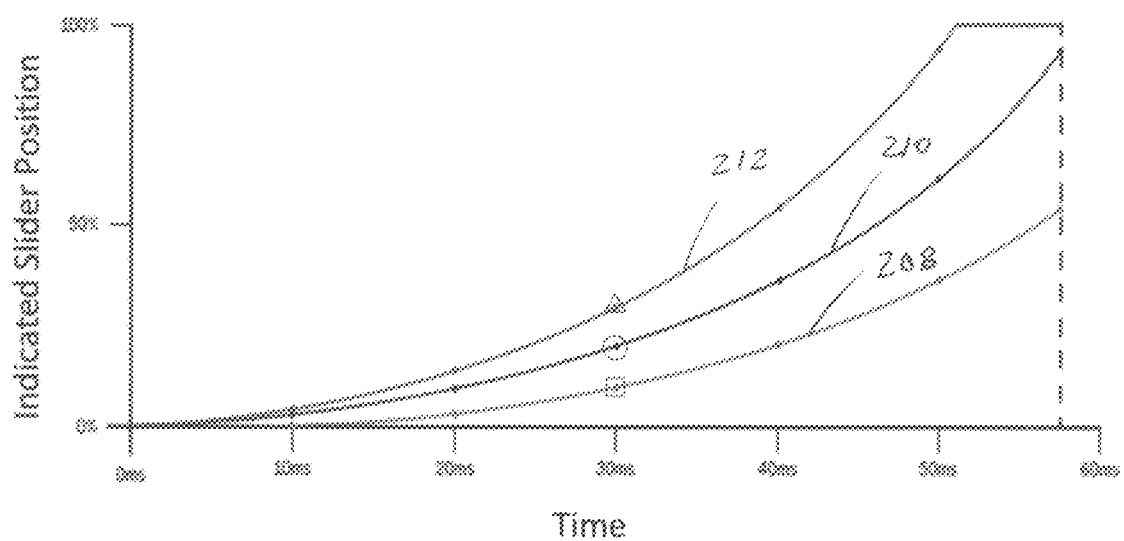

FIG. 2B shows examples of latency and acceleration applied to signals from or derived from the crossfader slider control 200B. As mentioned above, latency and acceleration may be applied to slider motion for example by rotating a microprocessor connected potentiometer left of zero for latency, and right of zero for acceleration.

In particular, three curves describe an indicated slider position as a function of time a) when no latency or acceleration is applied, b) when latency is applied and c) when acceleration is applied. Note that the indicated slider position is not the actual slider position when latency or acceleration is applied. But, it is the indicated slider position or a signal derived therefrom which the microprocessor sends to the mixer 104.

The central curve corresponds to a signal which is not delayed (latent) and which is not accelerated. Here, the actual slider position and the indicated slider position match.

The upper curve corresponds to the same signal after acceleration is applied. As such, the indicated slider position will be 100% before the actual slider position reaches 100%.

The lower curve corresponds to the same signal after latency is applied. As such, the indicated slider position will be less than 100% when the actual slider position reaches 100%.

The table below the figure shows how motion imparted to the slider is indicated for a) no latency or acceleration, b) latent motion, and c) accelerated motion. For example, a slider motion which takes 30 ms while moving 19% indicates a motion of 19% with no latency or acceleration. For example, a slider motion which takes 30 ms indicates a motion of 9% at a selected latency. For example, a slider motion which takes 30 ms indicates a motion of 30% at a selected acceleration.

Figure 2C:
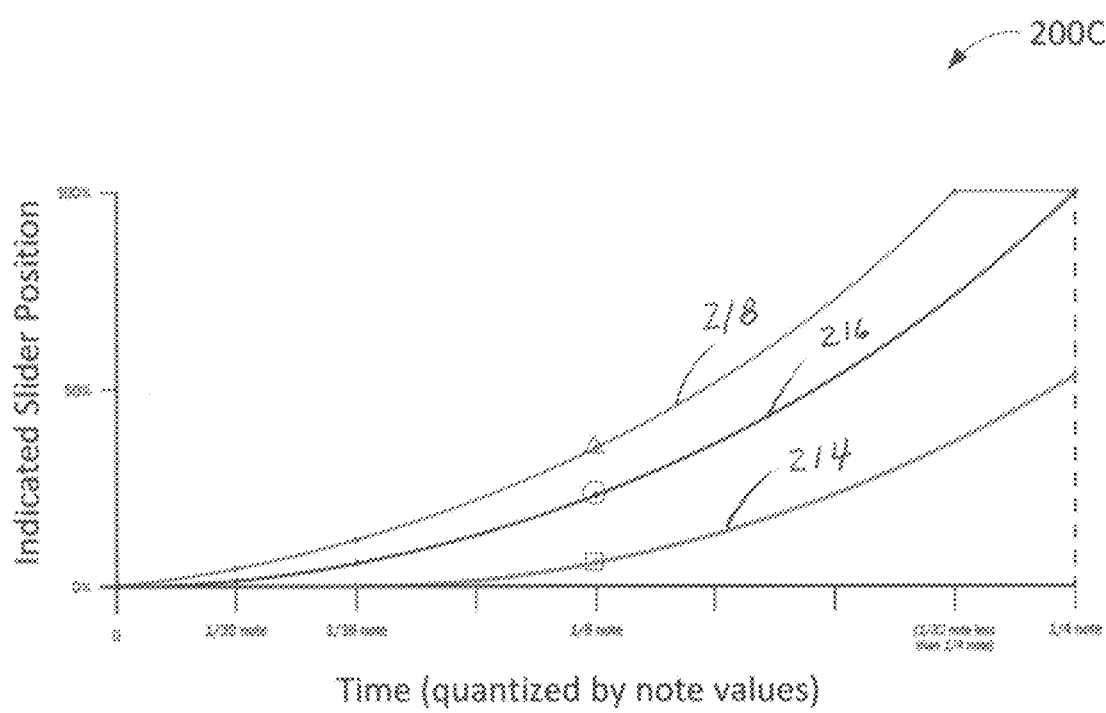

FIG. 2C shows and another example of latency and acceleration applied to signals from or derived from the crossfader slider control 200C. Here, indicated slider motion is shown to vary with musical time such as ⅛ and ¼ notes referred to here as a quantized version. As before, the central curve without latency or acceleration matches indicated and actual slider positions. As before, the indicated slider position will be 100% before the actual slider position reaches 100%. As before, the indicated slider position will be less than 100% when the actual slider position reaches 100%.

The table below the figure shows in this quantized version how motion imparted to the slider is indicated for a) no latency or acceleration, b) latent motion, and c) accelerated motion. For example, a slider motion which takes ⅛ note while moving 19% indicates a motion of 19% with no latency or acceleration. For example, a slider motion which takes ⅛ note indicates a motion of 7% at a selected latency. For example, a slider motion which takes ⅛ note indicates a motion of 34% at a selected acceleration.

Figure 2D:
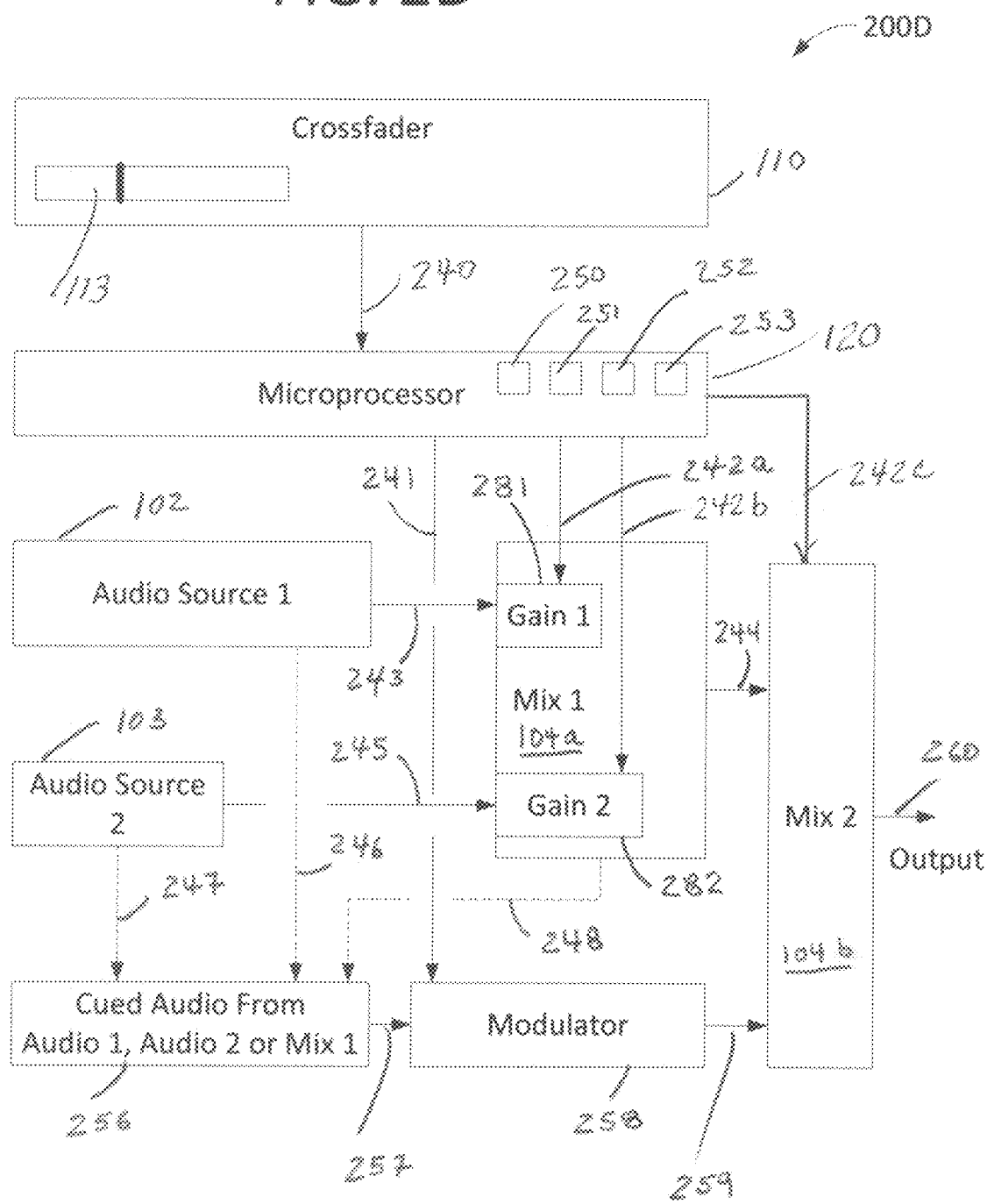
FIGS. 2D-E show an embodiment of the fade device with modulation.
Figure 2E:
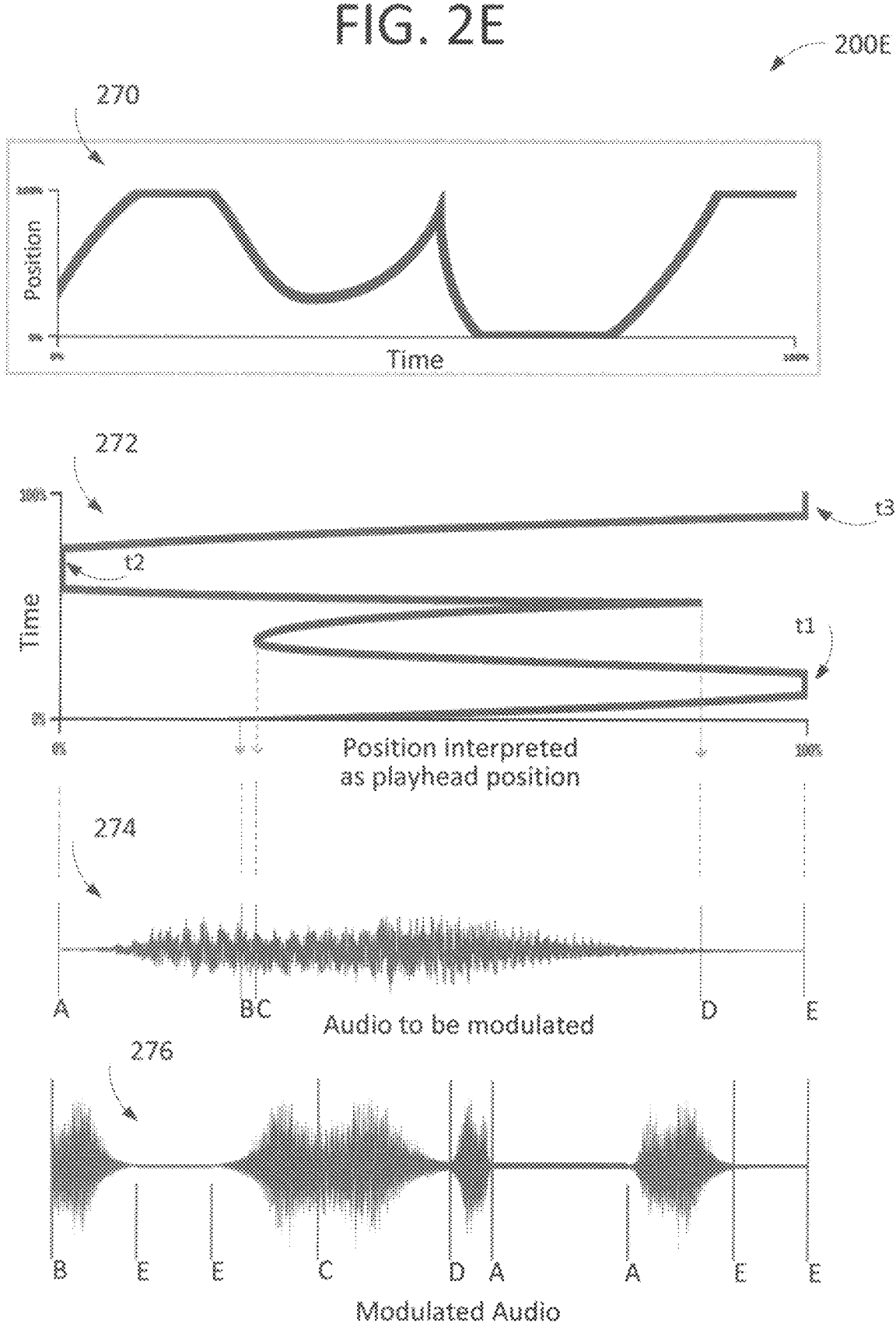

FIGS. 2D-E show sequential mixing of processed audio signals where some embodiments/applications emulate the transition from one audio source to another such as a Disk Jockey's transition from one turntable audio source to another turntable audio source (e.g., a turntablist practicing turntablism) 200D-E.

In FIG. 2D a crossfader 110 with a crossfader slider control 113 sends slider signals 240 to a microprocessor 120. A master buffer 250 within the microprocessor may hold actual slider motion versus time information. Microprocessor outputs include an output 241 to a modulator 258 and an outputs 242a, 242b to voltage controlled amplifiers 281 (Gain 1), 282 (Gain 2) associated with a first voltage controlled mixer 104a. In various embodiments, a mix of signals derived from the gain adjusted inputs provides a mixed signal. This mixed signal or a facsimile may appear at the Mix 1 output 244.

Microprocessor output 241 may be signal 240 with latency or acceleration applied. Microprocessor outputs 242a, 242b may be signal 240 with the same or different latencies or accelerations applied.

Signal sources for microprocessor output signals 241, 242a,b may be via any of several buffers, for example three buffers 251, 252, 253. Any of these buffers may contain a) a latent version of actual slider motion versus time information, b) an accelerated version of actual slider motion versus time information, or c) actual slider motion versus time information. These buffers may, as shown, be located in the microprocessor. Note that a latent signal buffer contains position versus time information where latency may be achieved by delayed recording. Note that an accelerated signal buffer contains position versus time information where acceleration may be achieved by a simulated version of recorded future movement.

As shown, the first mixer 104a receives audio inputs 243, 245 from respective audio sources 102, 103. This mixer outputs audio signal 244 to a second mixer or voltage controlled mixer 104b. Mixer 104b may be controlled by a microprocessor signal 242c. Microprocessor signal 242c may be derived from any of the microprocessor input parameters or crossfader slider 113 position(s).

Cued audio from audio source 1, audio source 2, or mix 1 is received in a cued audio block 256 via a respective one of related signals 246, 247, 248. A modulator 258 receives one of the microprocessor outputs 241 and a cued audio block output 257.

Regarding modulation, in various embodiments the crossfader slider 113 motion signal with latency or acceleration applied may be used to produce microprocessor signal 241 which modulates the cued audio 246, 247, 248 to produce a modulated cued audio output 259.

The second mixer 104b mixes the first mixer 104a audio output 244 and the modulator 258 audio output 259 to produce a sequential mixer output 260. Signal 248 is a first mixer output and may be a copy of signal 244.

The sequential mixer of FIG. 2D can be operated to produce a rhythmic cut between audio sources 102, 103 at the Mix 2 104b output 260. For example, application of acceleration or latency to a first mixer 104a audio signal 243, 245 can produce a rhythmic cut at the first mixer 104a output 244. And, a cued audio source 246, 247, 248 can result in a scratch sound (modulation of cued audio) at the output 259 of the modulator 258. The second mixer 104b combines outputs 244 and 259 to produce a rhythmic cut combined with the scratch sound which introduces the transitioned audio source.

FIG. 2E shows an example of modulation 200E. Signals are traced for a) position versus time 270, b) position interpreted as playhead position versus time 272, c) an audio signal to be modulated 274, and d) the audio signal after modulation 276.

The trace of position versus time 270 relates crossfader slider 113 or buffer position and time with or without latency or acceleration applied. In some embodiments, the position and time relationship is from, or is derived from, one of the buffers 250, 251, 253, 254 mentioned above.

The trace of time versus position interpreted as playhead position 272 is from, or is derived from, the trace of position versus time 270.

The trace of audio to be modulated 274 is an audio signal such as the output 257 of the cued audio signal block 256. In some embodiments, this signal is amplitude (vertical axis) versus time (horizontal axis).

The trace of the modulated audio 276 shows the audio signal 274 after it is modulated by the time versus buffer position interpreted as playhead position signal 272. In some embodiments, this signal is amplitude (vertical axis) versus time (horizontal axis).

The modulated audio signal 276 that results from playhead movement 272 may be described as follows.

Playhead moves from B to E. As seen, the playhead position 272 signal guides the playhead from B to E which plays the audio signal 274 from B to E as shown in the modulated audio signal 276.

Playhead dwells on E. As seen, the playhead position signal 272 is a vertical trace during time t1 resulting in a period of no modulated audio 276 from E to E.

Playhead moves from E to C. As seen, the playhead position 272 signal guides the playhead from E to C which plays the audio signal 274 from E to C as shown in the modulated audio signal 276.

Playhead moves from C to D. As seen, the playhead position 272 signal guides the playhead from C to D which plays the audio signal 274 from C to D as shown in the modulated audio signal 276.

Playhead moves from D to A. As seen, the playhead position 272 signal guides the playhead from D to A which plays the audio signal 274 from D to A as shown in the modulated audio signal 276.

Playhead dwells on A. As seen, the playhead position signal 272 is a vertical trace during time t2 resulting in a period of no modulated audio 276 from A to A.

Playhead moves from A to E. As seen, the playhead position 272 signal guides the playhead from A to E which plays the audio signal 274 from A to E as shown in the modulated audio signal 276.

Playhead dwells on E. As seen, the playhead position signal 272 is a vertical trace during time t3 resulting in a period of no modulated audio 276 from E to E.

Figure 3A:
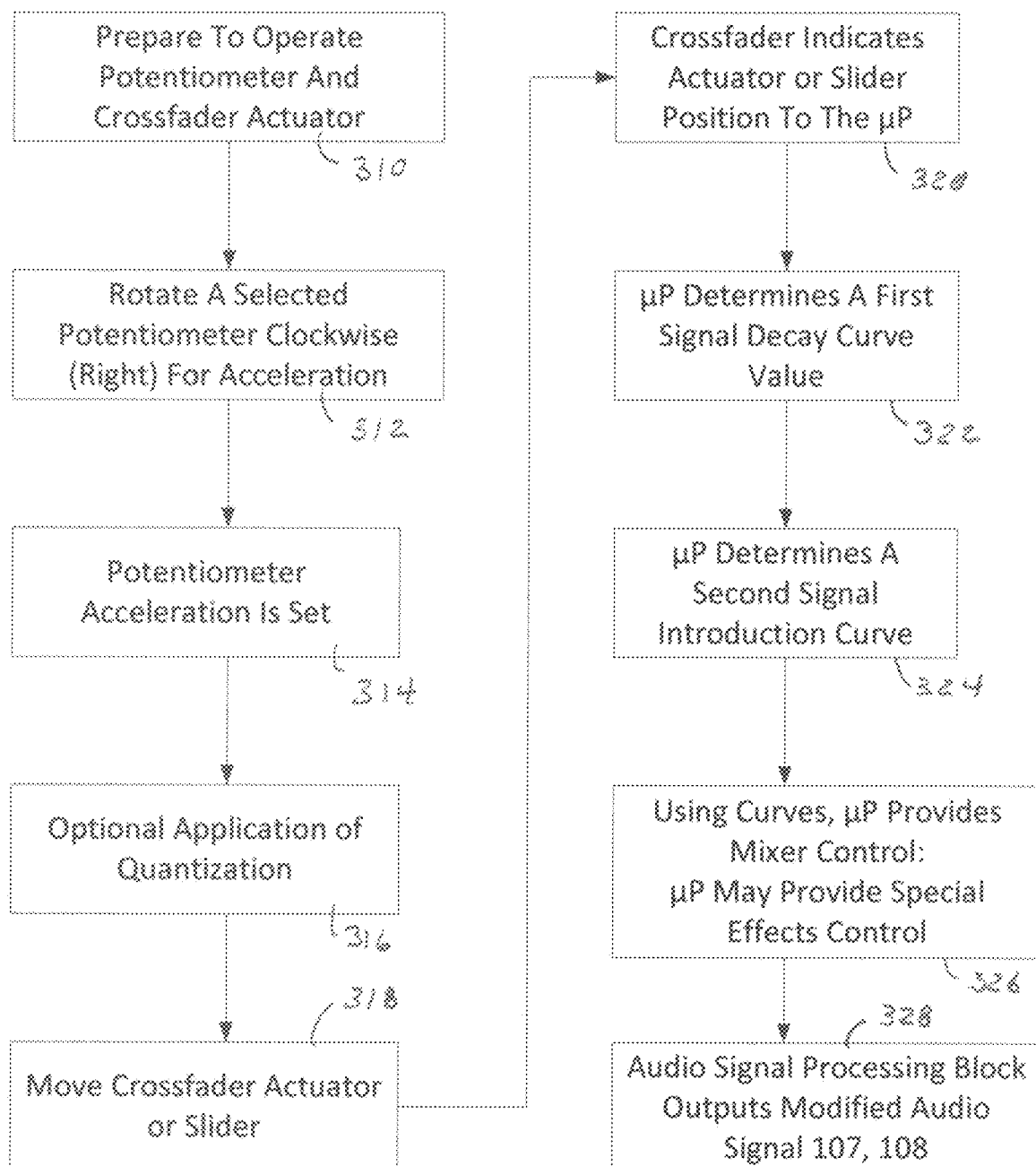
FIGS. 3A-B show operation of the fade device when an acceleration operation is chosen.
Figure 3B:
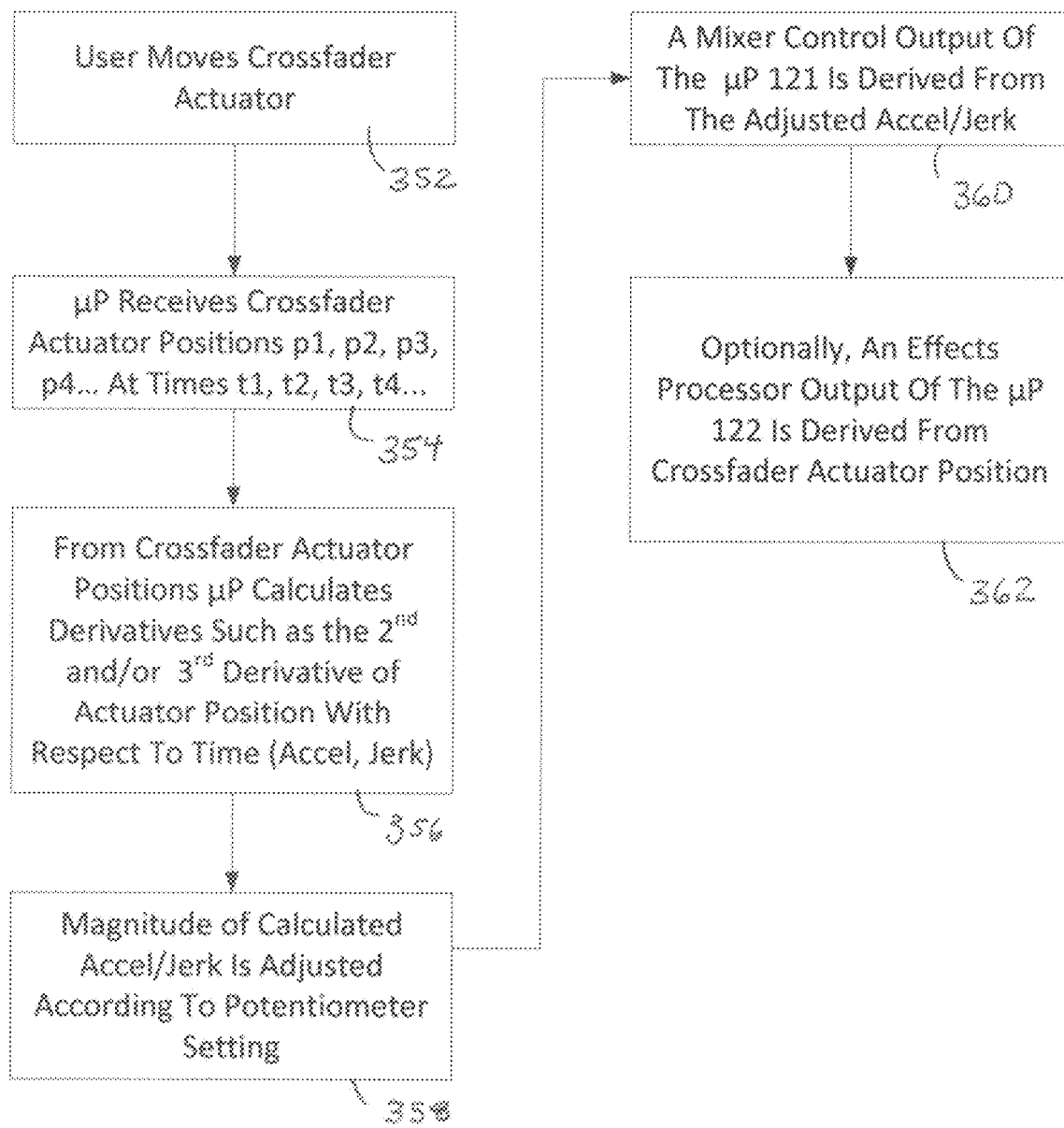

FIGS. 3A-B are flowcharts showing multiple steps, one or more of which implement an example of acceleration 300A-B.

In FIG. 3A, a fade device similar to the fade device of FIG. 1C is readied for operation. In this example, a potentiometer 144 is operated before the crossfader actuator 113 is operated 310.

A selected potentiometer 144 is rotated clockwise which indicates acceleration 312 and provides an acceleration setting 314. At this point, the signal may be quantized 316.

Once the potentiometer 144 is set, the crossfader actuator may be moved 318. An indication of crossfader slider motion and/or position is provided to the processor 320. From the indication of position, the processor may determine a first signal decay curve value and may determine a second signal introduction curve 320, 322.

In step 326, based on information which may include one or more processor inputs of FIG. 1D and which may include values or functions of the curves 322, 234, a signal is derived that provides mixer control 121. In step 326, based on information which may include crossfader slider position or the above, a signal may be derived that provides special effects control 122.

The mixer 104 and optionally the effects processor 106 respond to signals 121, 122 from the processor. And, as shown in step 328, the audio signal processing block C outputs a modified audio signal 107, 108.

FIG. 3B shows additional processor 120 responses that may occur with crossfader actuator 113 movement(s) when the potentiometer 144 is set for acceleration, for example the acceleration of FIG. 3A.

In step 352, the crossfader actuator 113 is moved or moving and in step 354 the processor receives an indication of the crossfader movement. For example, the crossfader may move through positions p1, p2, p3, p4 . . . . In various embodiments, the processor associates timing and/or time differences with the these positions, for example t1, t2, t3, t4 . . . .

Crossfader actuator 113 positions and times are used to estimate changes with respect to time. For example, calculations similar to or having a similar result to a divided difference table may be used to estimate derivatives of position with respect to time such as velocity, acceleration and jerk (first, second, and third time derivatives) 356.

In step 358, after jerk is calculated, it is adjusted according to the potentiometer 144 setting. This is followed by a mixer control output 121 that is a function of at least the adjusted jerk value which is provided to the mixer 104.

Optionally, the effects processor 106 receives a control signal from the processor 120. This effects processor control signal 122 may be a function of crossfader actuator position.

The MIDI (Musical Instrument Digital Interface) outputs 186, 188 may be a function of the effects processor input 122 or a signal similar to the effects processor input. The CV (control voltage) 184 may also be a function of the mixer input 121 or a signal similar to the mixer input signal.

Figure 4A:
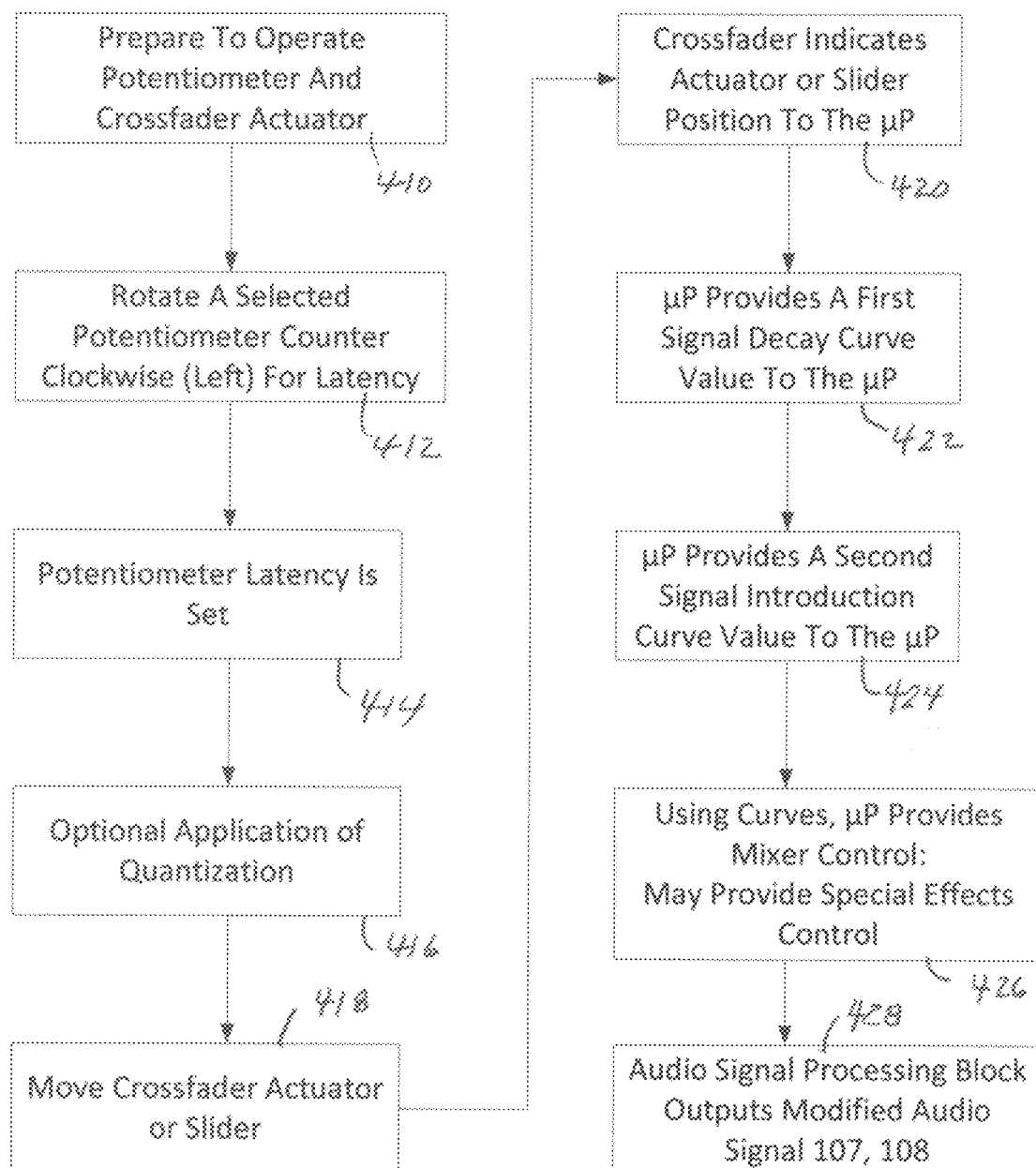
FIGS. 4A-B show operation of the fade device when a latency operation is chosen.
Figure 4B:
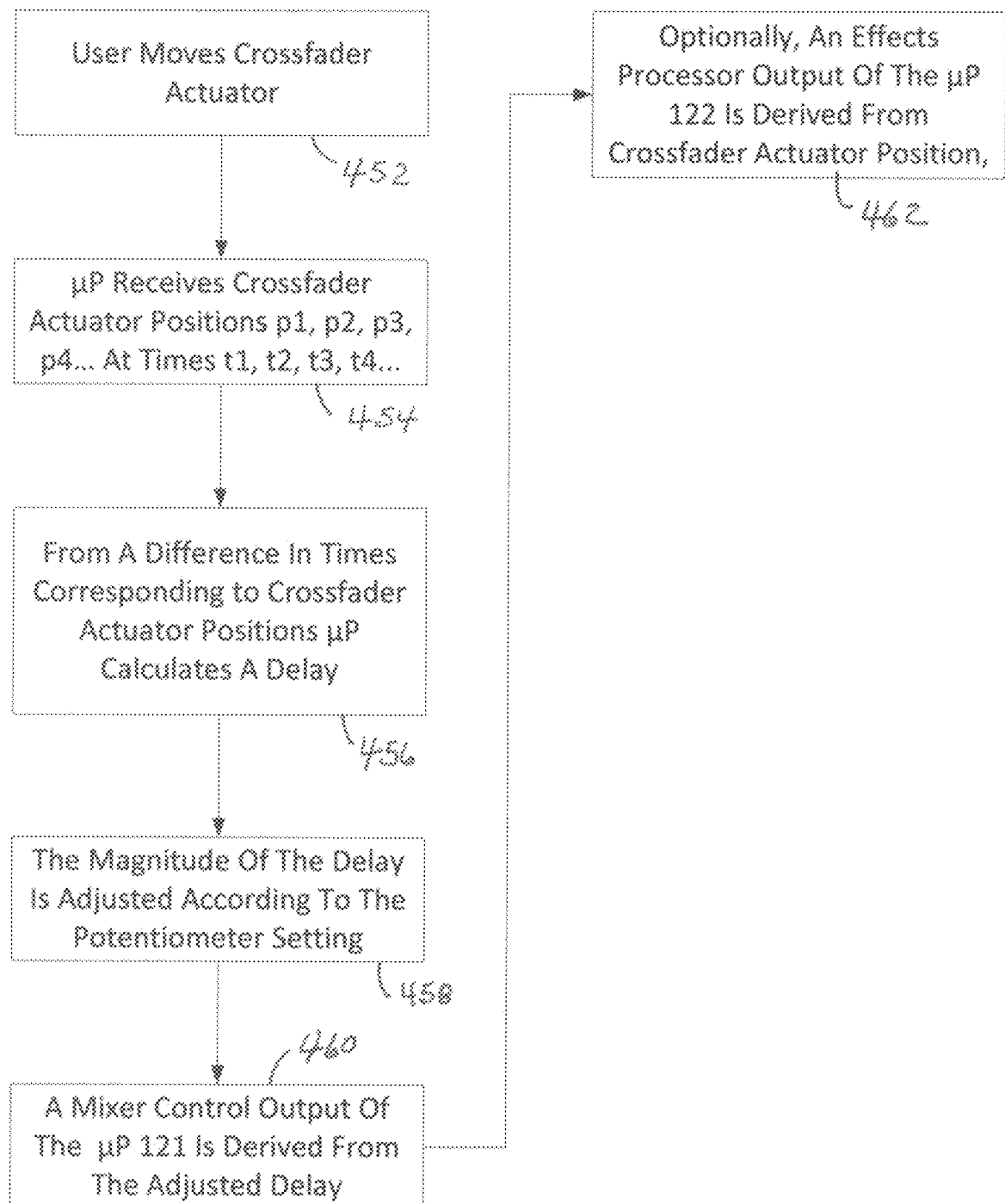

FIGS. 4A-B are flowcharts showing an exemplary implementation of latency 400A-B.

In FIG. 4A, a fade device similar to the fade device of FIG. 1C is readied for operation. In this example, a potentiometer 144 is operated before the crossfader actuator 113 is operated 410.

A selected potentiometer 144 is rotated counterclockwise which indicates latency 412 and provides a latency setting 414. At this point, the signal may be quantized 416.

Once the potentiometer 144 is set, the crossfader actuator may be moved 418. An indication of crossfader slider motion and/or position is provided to the processor 420. From the indication of position, the processor may determine a first signal decay curve value and may determine a second signal introduction curve 422, 424.

In step 426, based on information which may include one or more processor inputs of FIG. 1D and which may include values or functions of the curves 422, 424, a signal is derived that provides mixer control 121. In step 426, based on information which may include crossfader slider position or the above, a signal may be derived that provides special effects control 122.

The mixer 104 and optionally the effects processor 106 respond to signals 121, 122 from the processor. And, as shown in step 428, the audio signal processing block C outputs a modified audio signal 107, 108.

FIG. 4B shows how the additional processor 120 responses that may occur with crossfader actuator 113 movement(s) when the potentiometer 144 is set for latency.

In step 452, the crossfader actuator 113 is moved or moving and in step 454 the processor receives an indication of the crossfader movement. For example, the crossfader may move through positions p1, p2, p3, p4 . . . . In various embodiments, the processor associates timing and/or time differences with the these positions, for example t1, t2, t3, t4 . . . .

In step 456, the microprocessor 120 calculates a difference in times associated with crossfader actuator 113 positions. Delay is a function of this time difference. Notably, the difference in crossfader actuator times may be a difference in any two times corresponding to positions known to the processor, for example $(t_{n+1} - t_n)$.

In step 458, the magnitude of the delay is adjusted. The adjustment is a function of the potentiometer 144 setting and may be a function of the processor inputs of FIG. 1D.

In step 460 a processor mixer control output 121 is sent to the mixer 104. This output is derived from the adjusted delay. Optionally, in step 462 an effects processor control output of the processor 122 is derived from the crossfader actuator position 113 and sent to the effects processor 106.

The MIDI (Musical Instrument Digital Interface) outputs 186, 188 may be a function of the effects processor input 122 or a signal similar to the effects processor input. The CV (control voltage) 184 output may also be a function of the mixer input 121 or a signal similar to the mixer input.

FIGS. 5A-12 are figures including block diagrams and flow charts that show various configurations, controls, operations, and functions of various embodiments of the fade device 500A-1200. Each figure is intended to be self-explanatory and, as seen, each figure may refer to other figures in this application.

FIGS. 5A-F show embodiments of buffers, controls, and functions associated with the fade device 500A-H. These figures are for reference as they are referred to by various ones of the figures which follow.

Figure 5A:
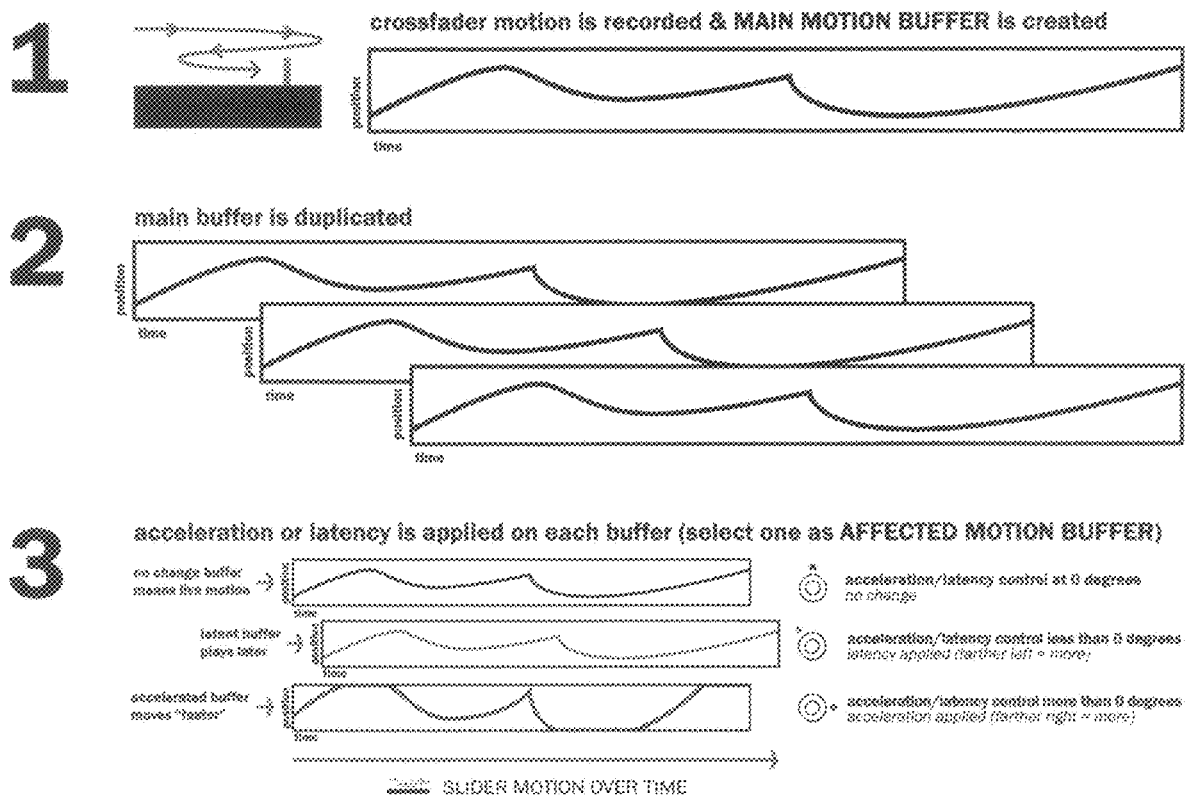
Figure 5D:
Figure 5D:
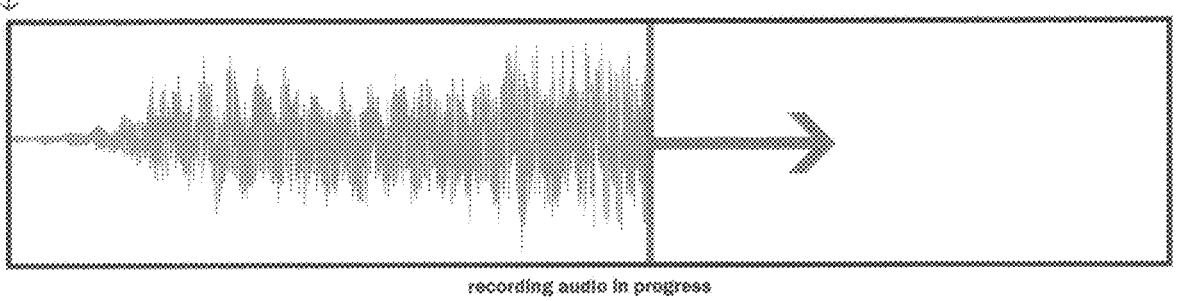
Figure 5E:
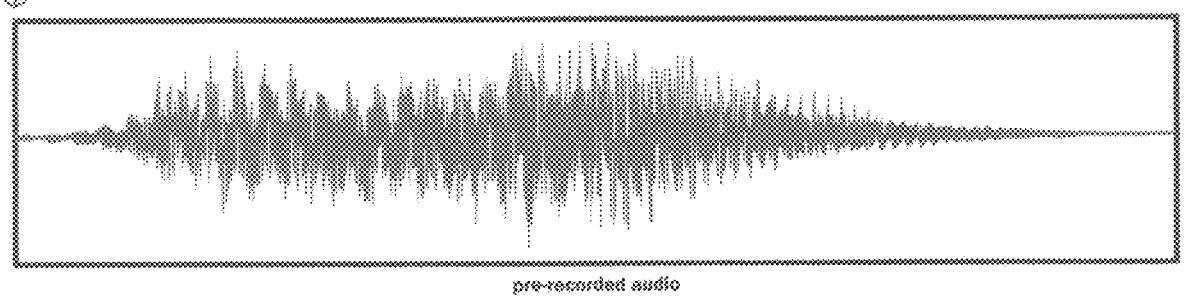
Figure 5F:
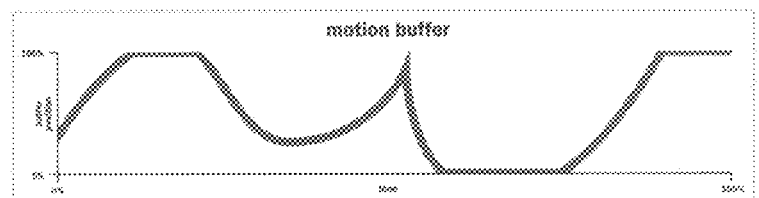
Figure 5F:
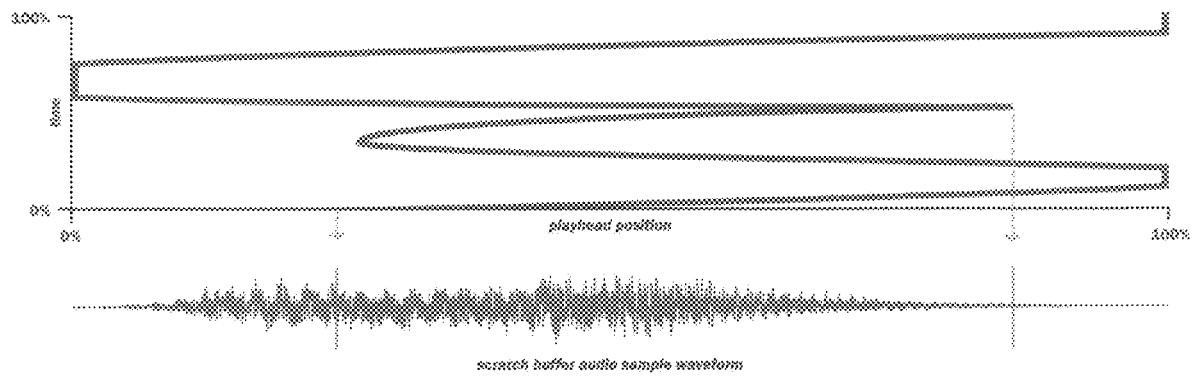
Figure 5G:
Figure 5G:
Figure 5G:
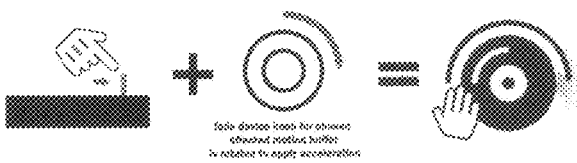
Figure 5G:
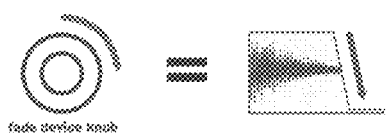
Figure 5H:
Figure 5H:
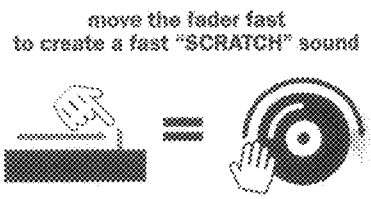
Figure 5H:
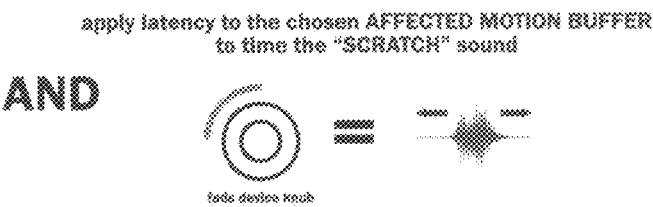
Figure 5H:
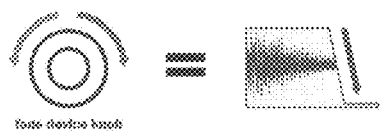

FIGS. 5G-H show methods of scratching. For example, what a turntablist achieves with two hands, by moving a record platter or a CDJ (compact disk jockey) controller platter with one hand while manipulating a crossfader with the other hand can be achieved with this fade device using only hand. This is the ONE HAND SCRATCH. The steps taken to create a ONE HAND SCRATCH on a fade device can be represented by the following:

STEP 1: Initiate Scratch Buffer Playback OPTION 2
STEP 2: (choose one below to create a scratch sound)
Move the Fader Slowly to create a slow "scratch" sound
Move the Fader Slowly to create a slow "scratch" sound and apply latency to the chosen Affected Motion Buffer to time the "scratch" sound
Move the Fader Slowly and apply acceleration to create a fast "scratch" sound
Move the fader fast to create a fast "scratch" sound
Move the fader fast to create a fast "scratch" sound AND apply latency to the chosen Affected Motion Buffer to time the "scratch" sound STEP 3
(choose one below to create a matching rhythmic cut)
Apply acceleration to Affected Motion Buffer A (the buffer Assigned to the crossfader) to create a matching rhythmic cut
Apply latency to Affected Motion Buffer A (the buffer Assigned to the crossfader) to create a matching rhythmic cut Once one of the options for Step 2 has been chosen and a corresponding option has been chosen from Step 3, a One Hand Scratch can be performed solely by performing Step 1 and sliding the crossfader.

The fade device can be used to either time the "scratch" to match the cut or time the cut to match the "scratch".

FIG. 5I shows embodiments of the fade device as a linear position controller of MIDI and Effects parameters as subdivided from the full range of motion of the linear position controller into smaller divisions of the same range 500I. This is the MIDI/effects expander.

Figure 6A:
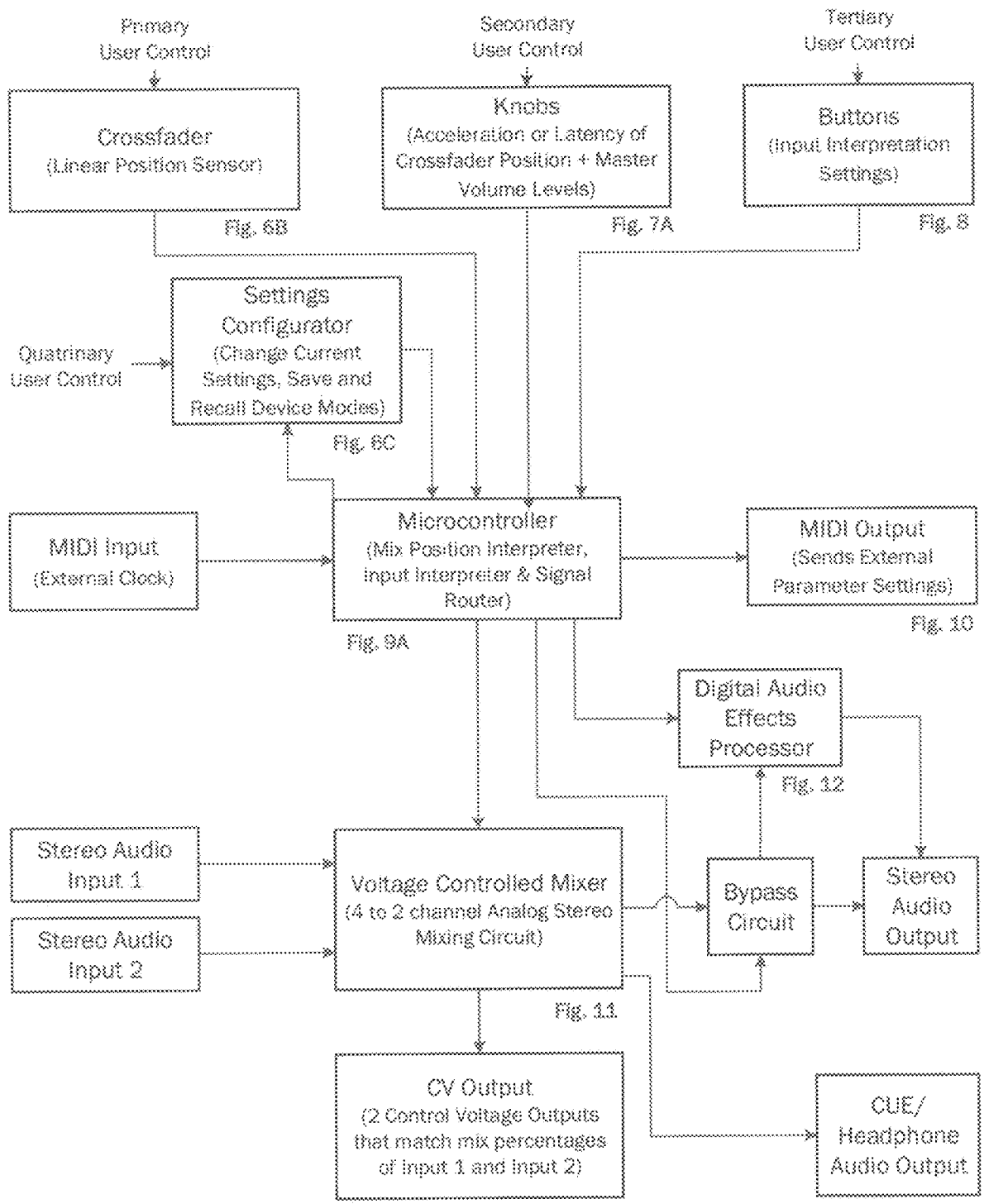
FIG. 6A shows an embodiment of the fade device configuration in block diagram form 600A.

FIG. 6A shows an embodiment of the fade device configuration in block diagram form 600A.

Figure 6B:
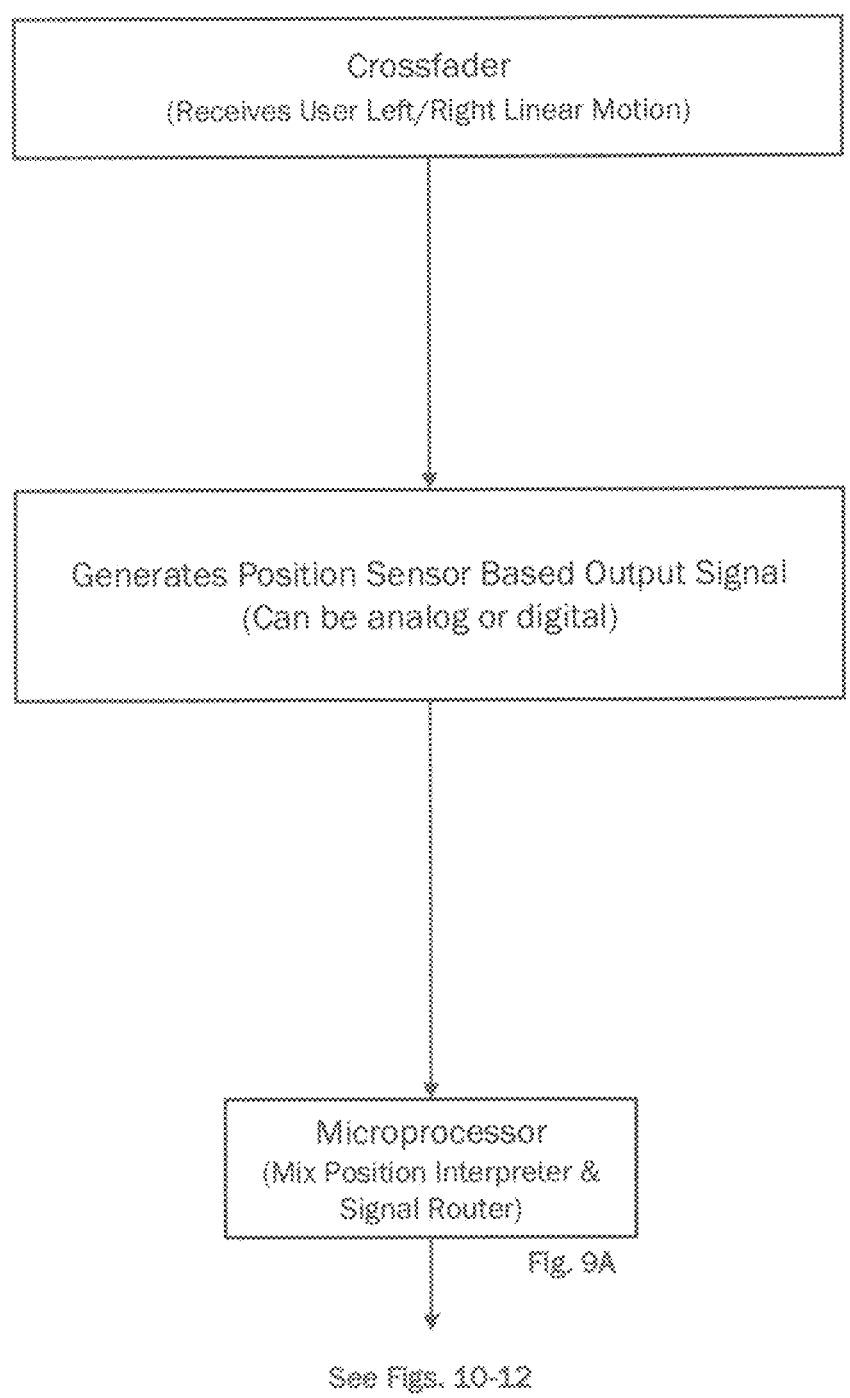
FIG. 6B shows an embodiment of primary user control.

FIG. 6B shows an embodiment of primary user control of the fade device 600B.

Figure 6C:
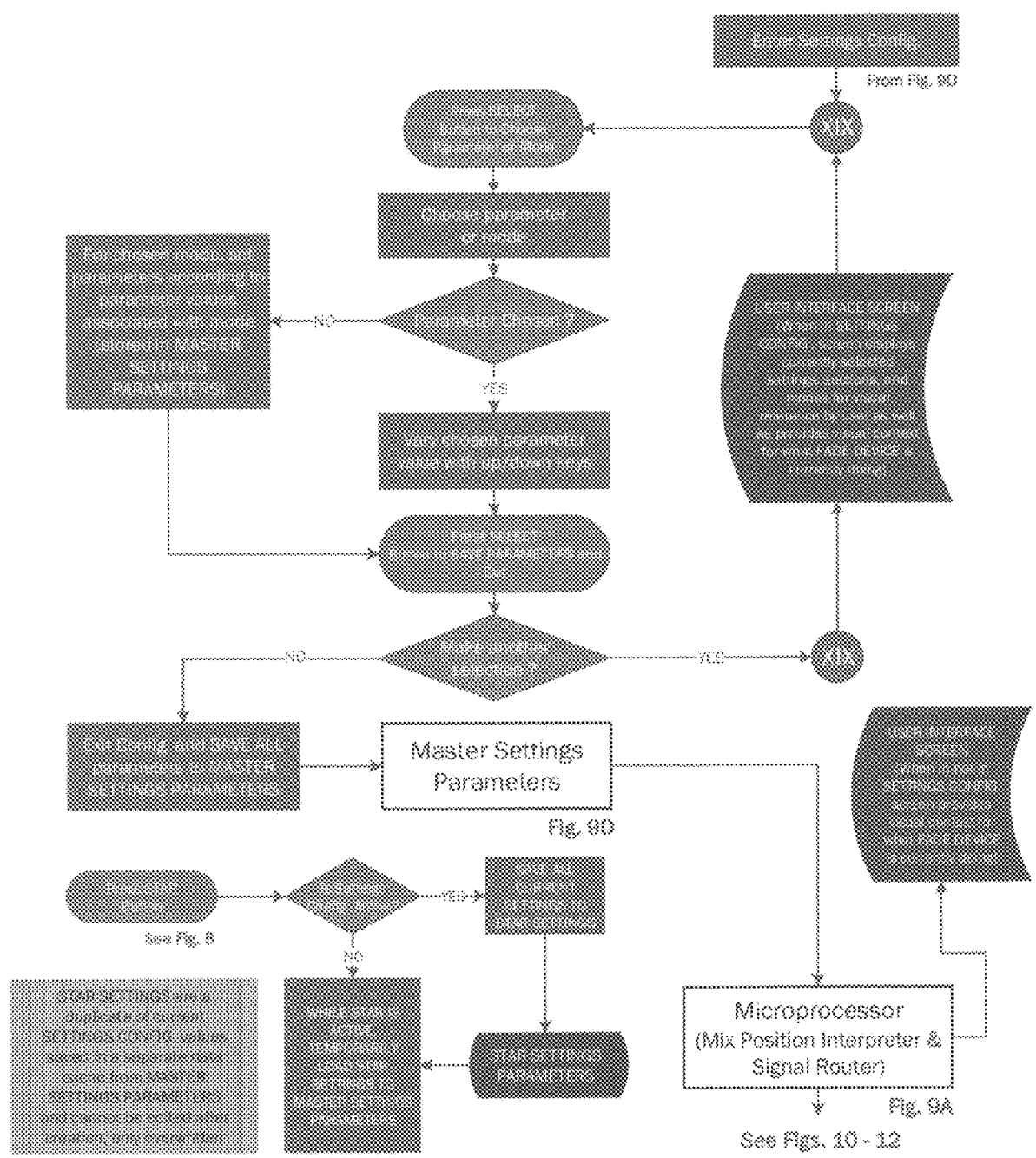
FIG. 6C shows an embodiment of quaternary user control.

FIG. 6C shows an embodiment of quaternary user control for, among other things, choosing microprocessor parameters settings 600C.

Figure 7A:
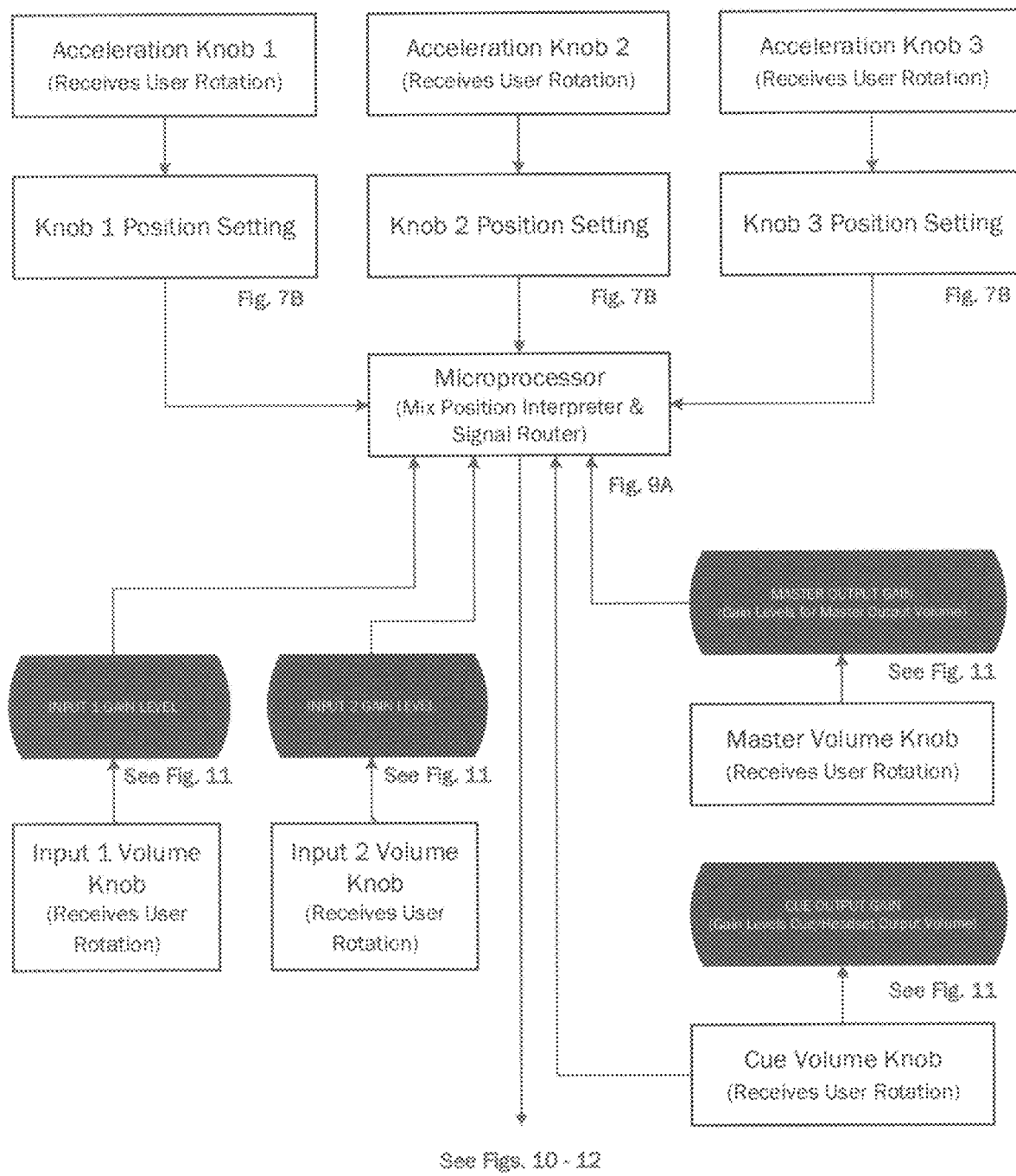
FIG. 7A shows an embodiment of secondary user control.

FIG. 7A shows an embodiment of secondary user control for example via fade device knobs affecting acceleration, latency, and master volume levels 700A.

Figure 7B:
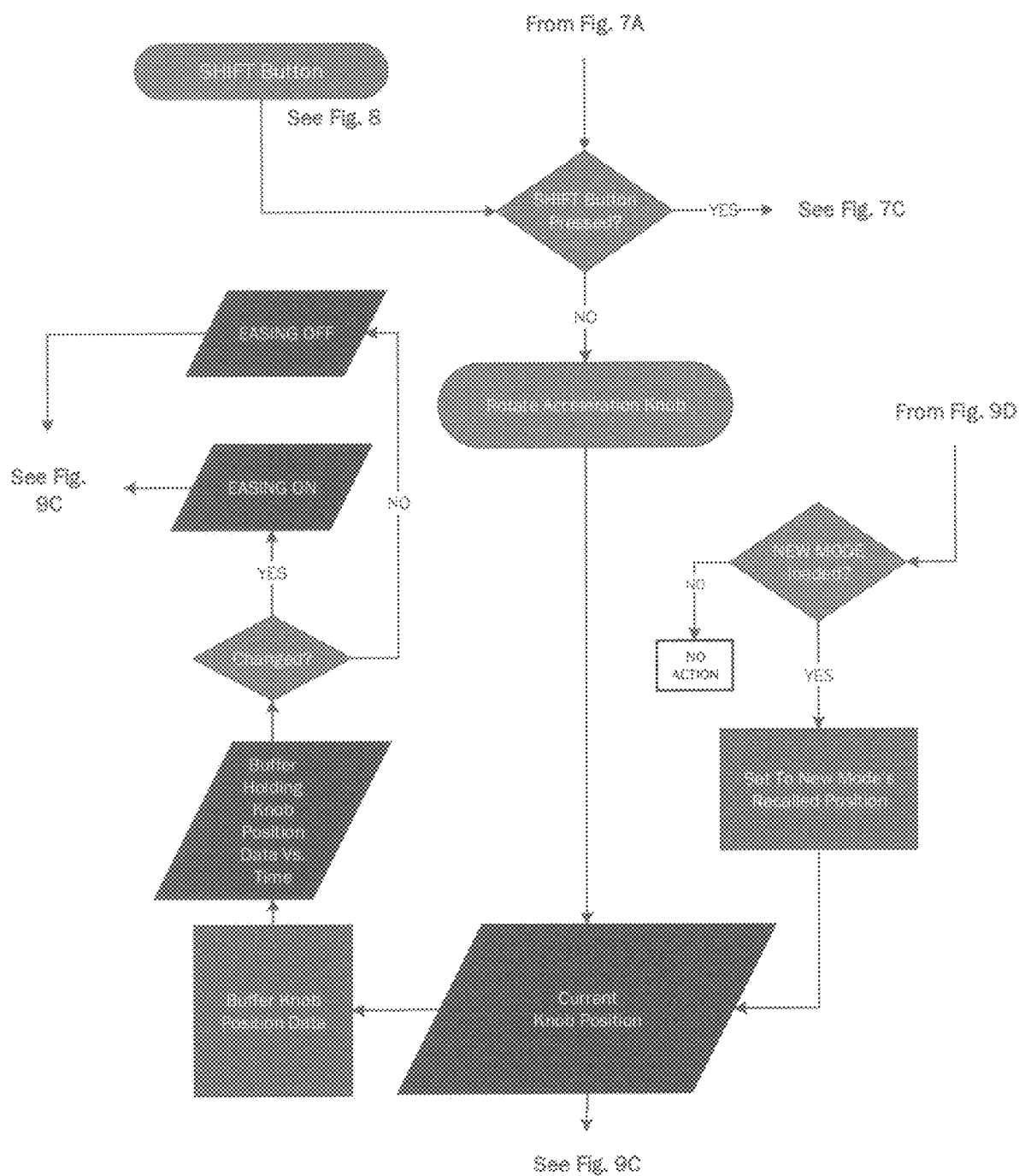
FIG. 7B shows an embodiment of acceleration/latency knob position settings.

FIG. 7B shows an embodiment of acceleration/latency knob position settings affecting acceleration, latency, and easing 700B.

Figure 7C:
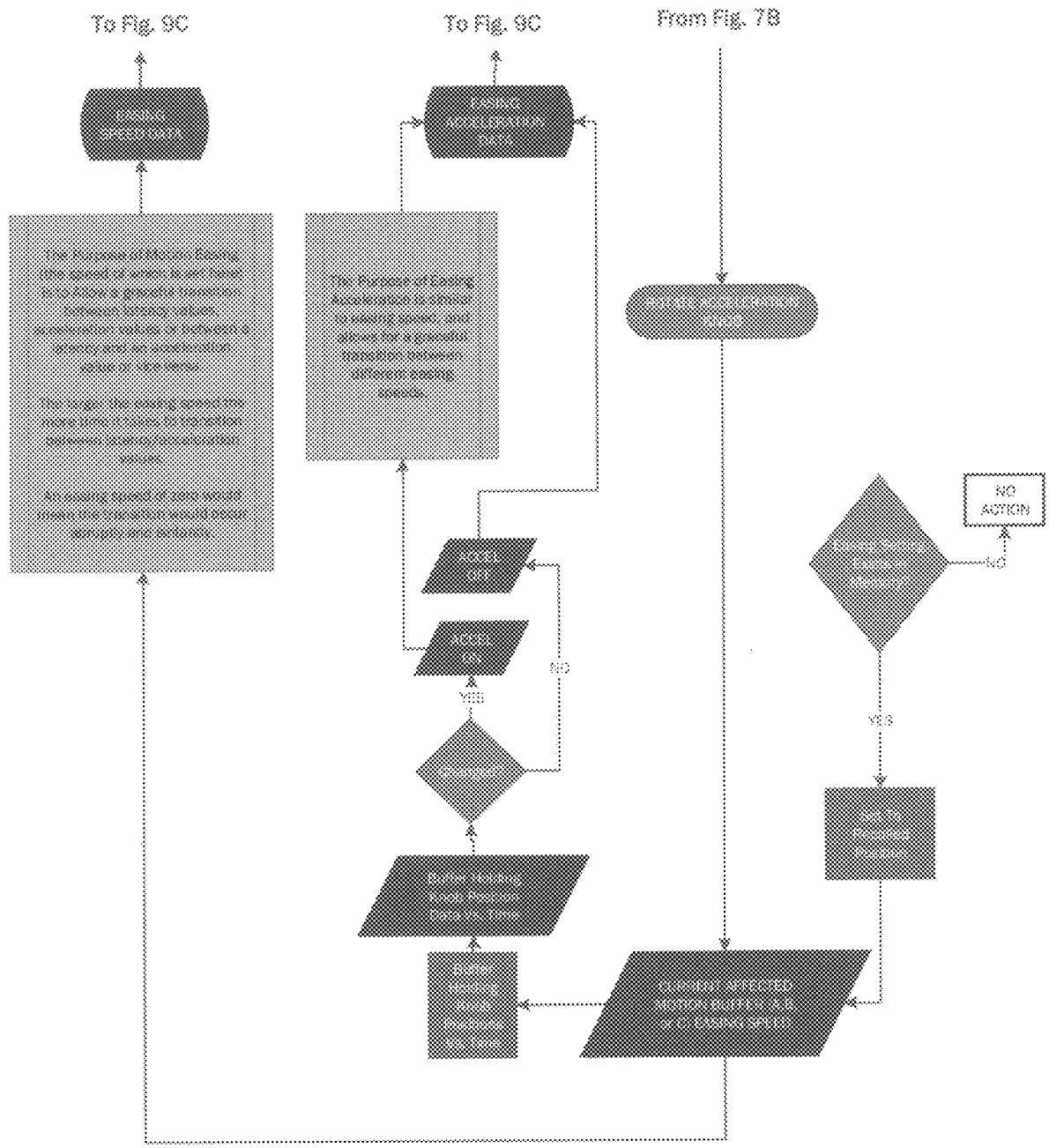
FIG. 7C shows an embodiment of motion easing settings.

FIG. 7C shows an embodiment of motion easing settings including easing for speed and easing for acceleration 700C.

Figure 8:
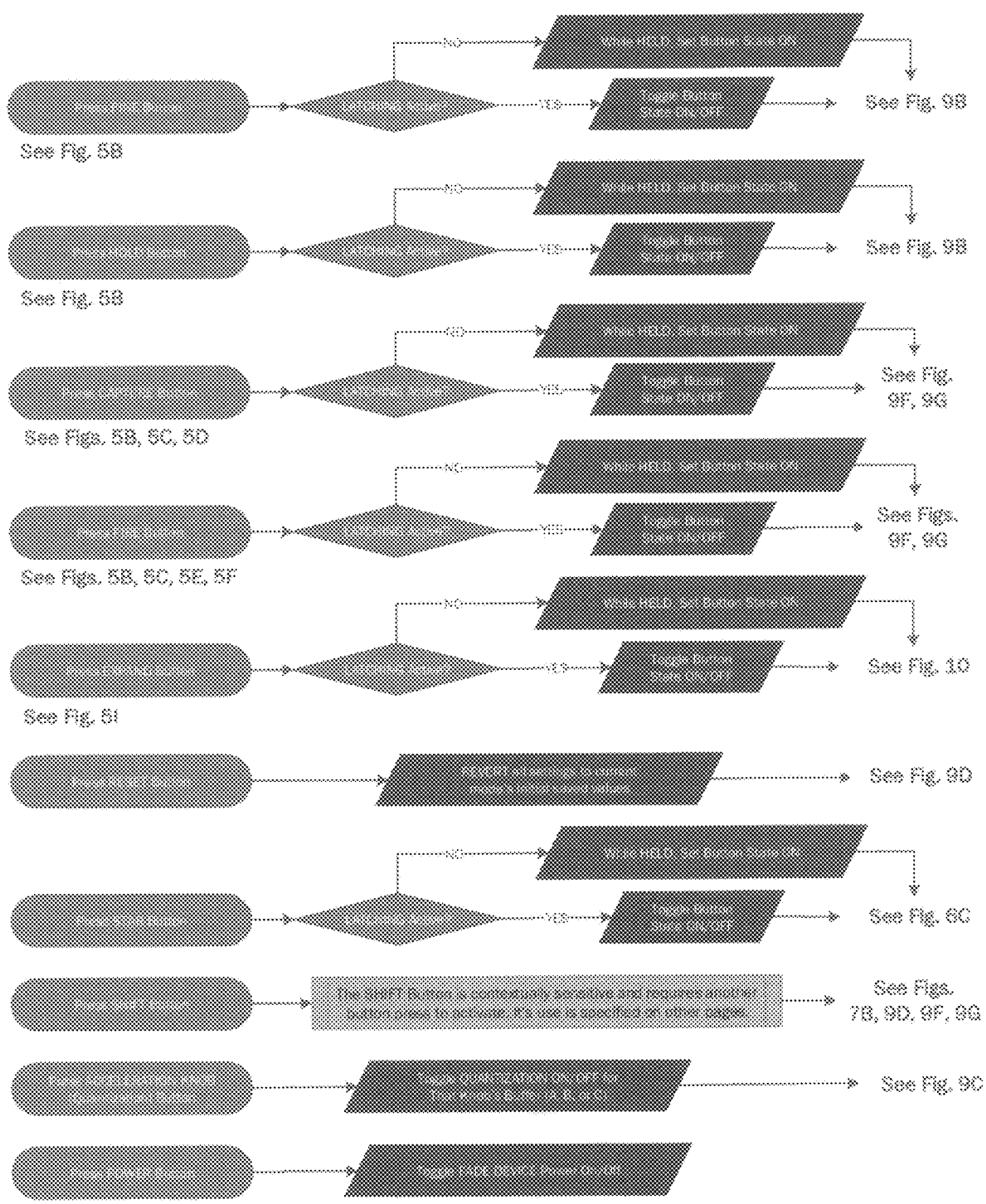
FIG. 8 shows an embodiment of tertiary user control.

FIG. 8 shows an embodiment of tertiary user control for example via buttons for setting/interpreting various inputs 800.

Figure 9A:
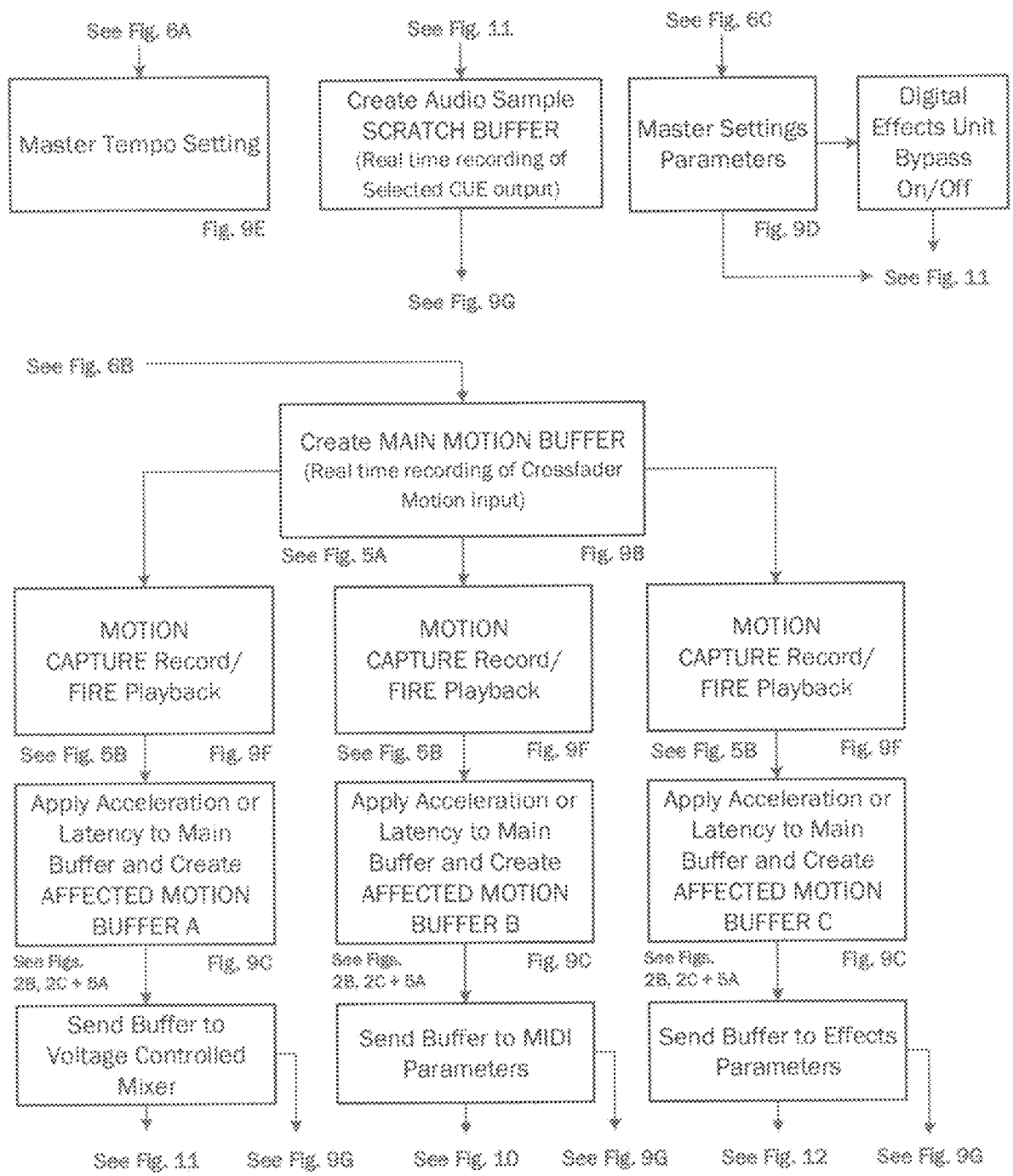
FIG. 9A shows an embodiment of the included processor or microcontroller.

FIG. 9A shows an embodiment of the fade device microcontroller for interpreting mix position and inputs and for routing signals 900A.

Figure 9B:
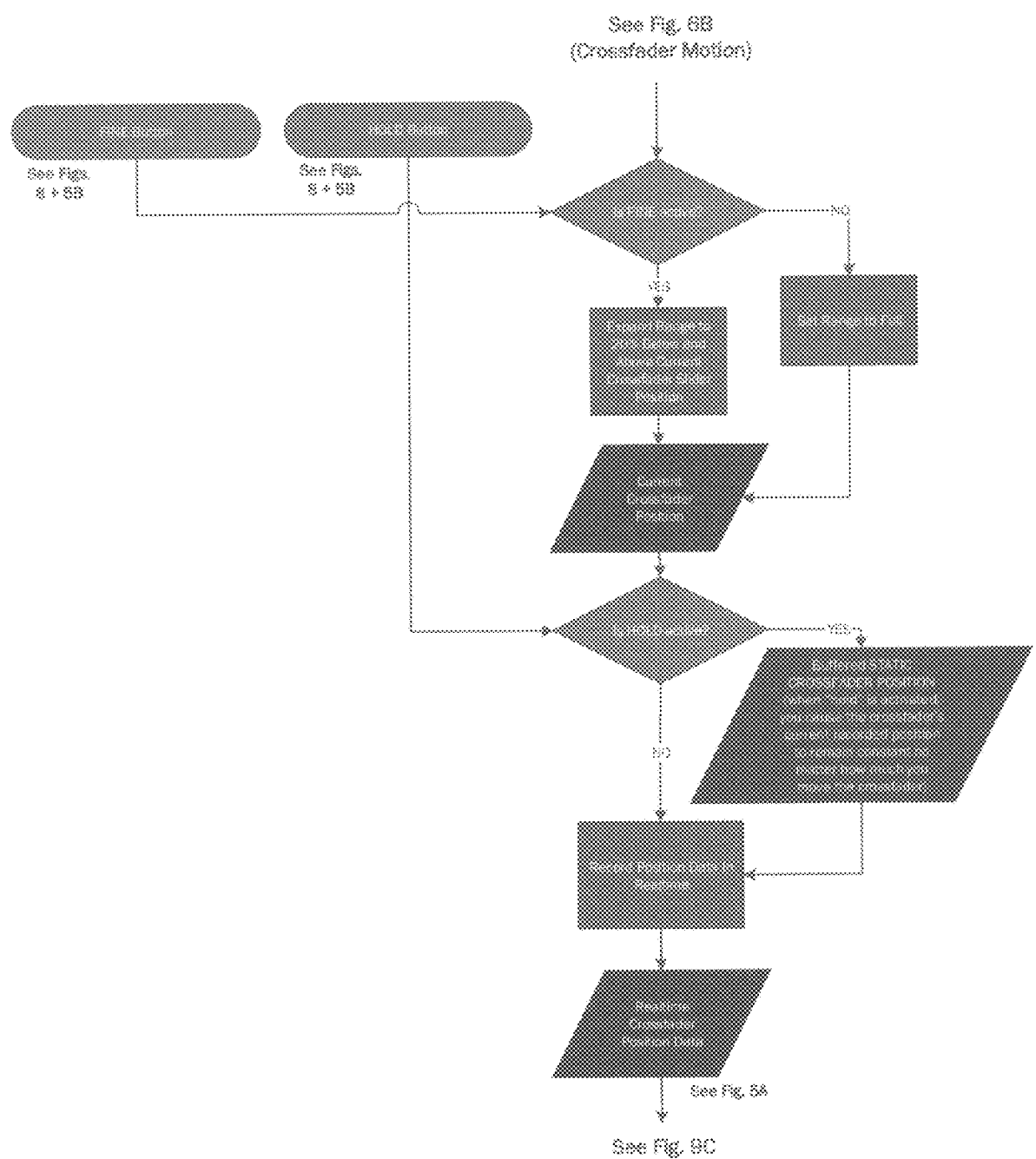
FIG. 9B shows an embodiment for recording crossfader position data.

FIG. 9B shows an embodiment for recording crossfader position data including a main motion buffer for recording position or position versus time of the crossfader control or slider position 900B.

Figure 9C:
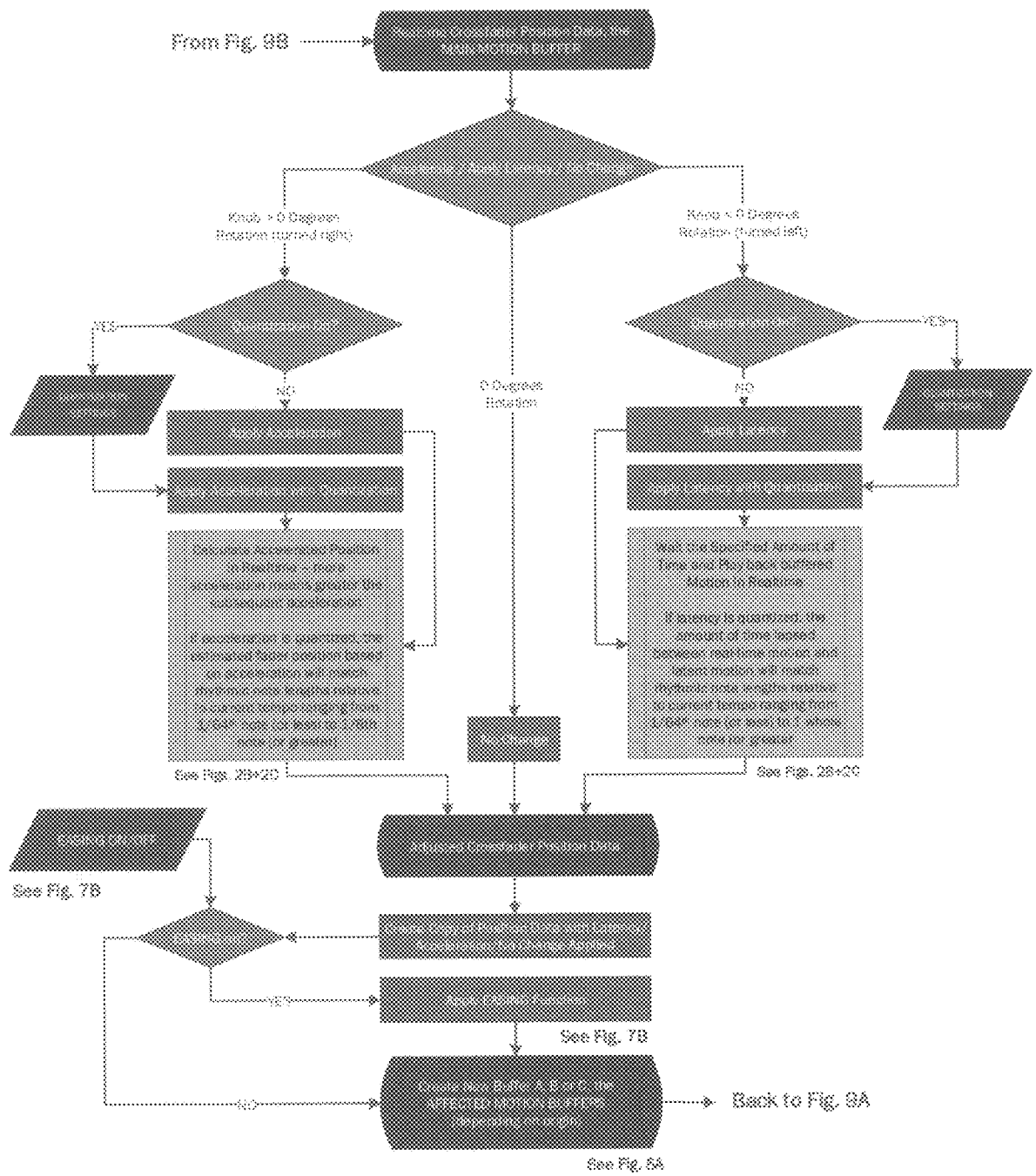
FIG. 9C shows an embodiment for applying latency or acceleration with or without quantization.

FIG. 9C shows an embodiment for applying latency or acceleration with or without quantization and for loading affected motion buffers with this information 900C.

Figure 9D:
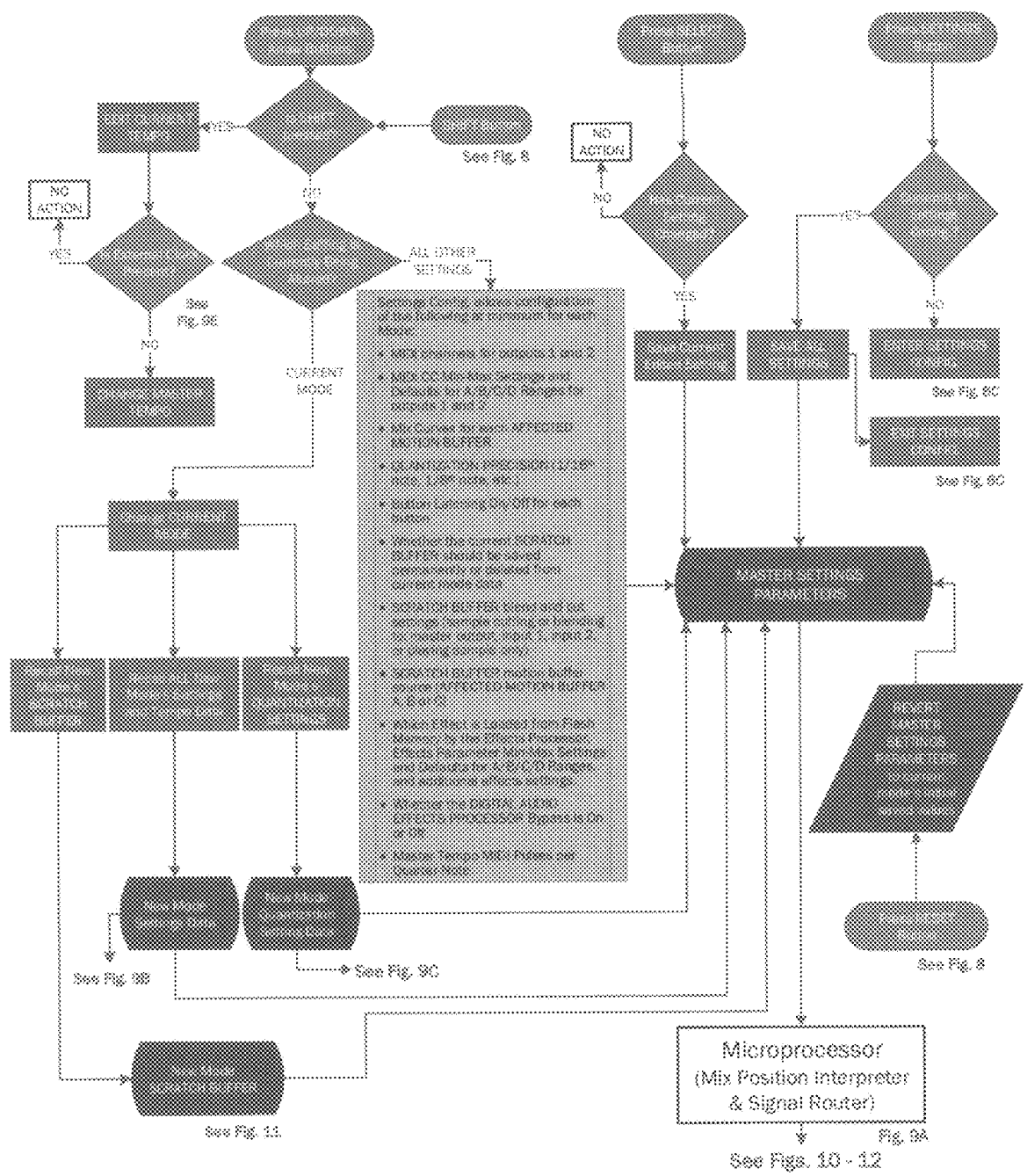
FIG. 9D shows exemplary master settings parameters.

FIG. 9D shows exemplary master settings parameters and how these settings might be made 900D.

Figure 9E:
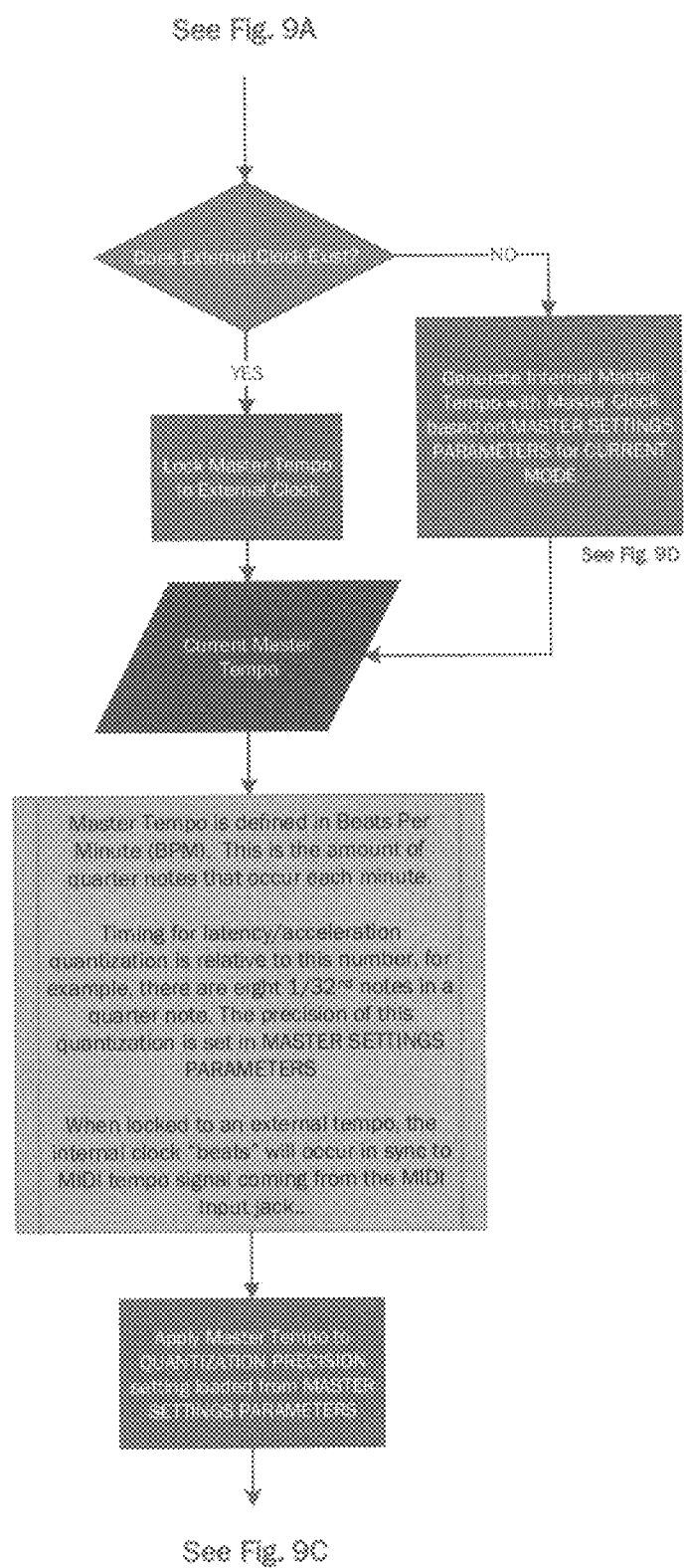
FIG. 9E shows an example of setting a master tempo.

FIG. 9E shows an example of how a master tempo setting might be made 900E.

Figure 9F:
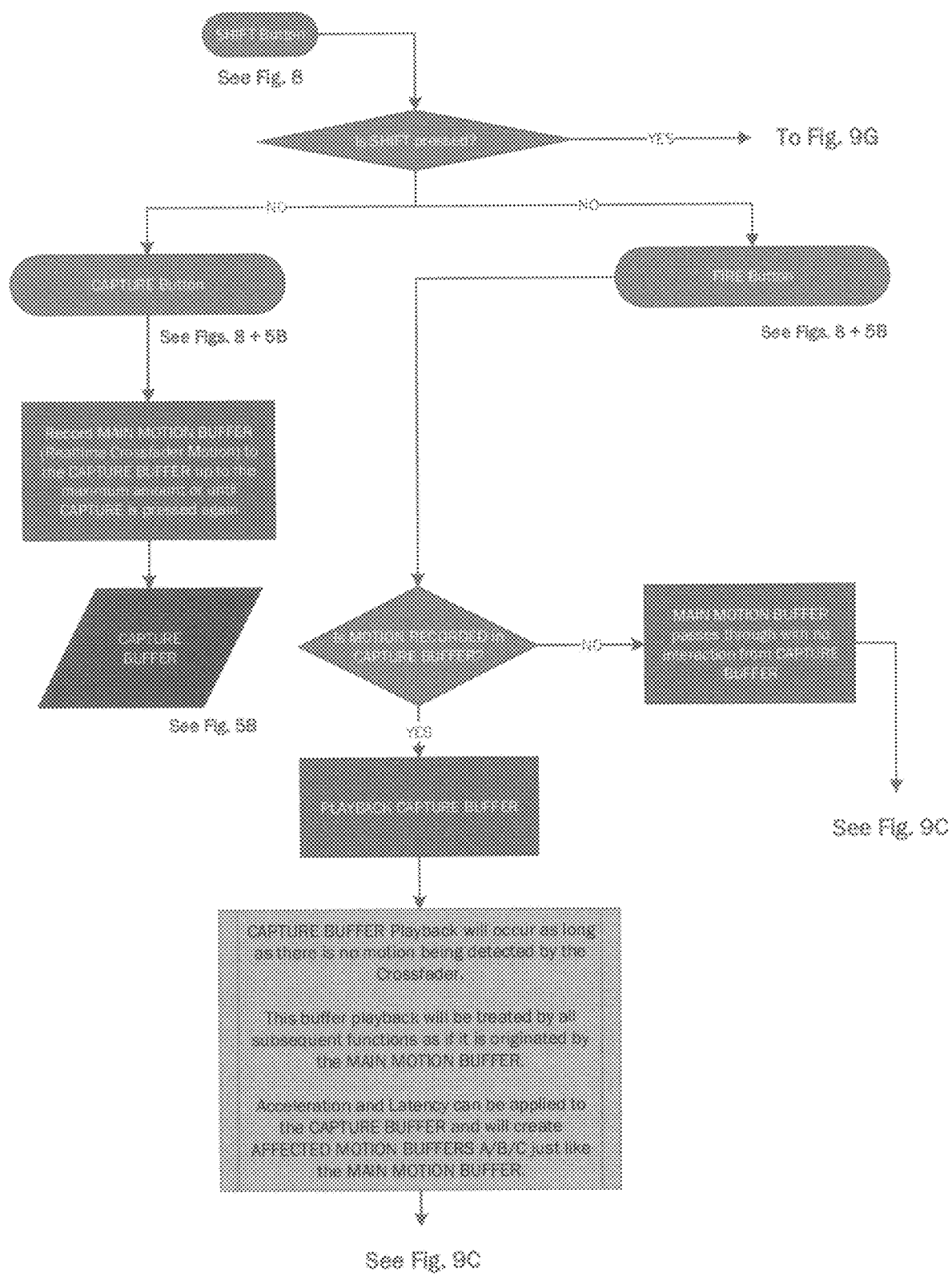
FIG. 9F shows an example of crossfader motion capture and fire operations.

FIG. 9F shows an example of crossfader motion capture and fire operations 900F.

Figure 9G:
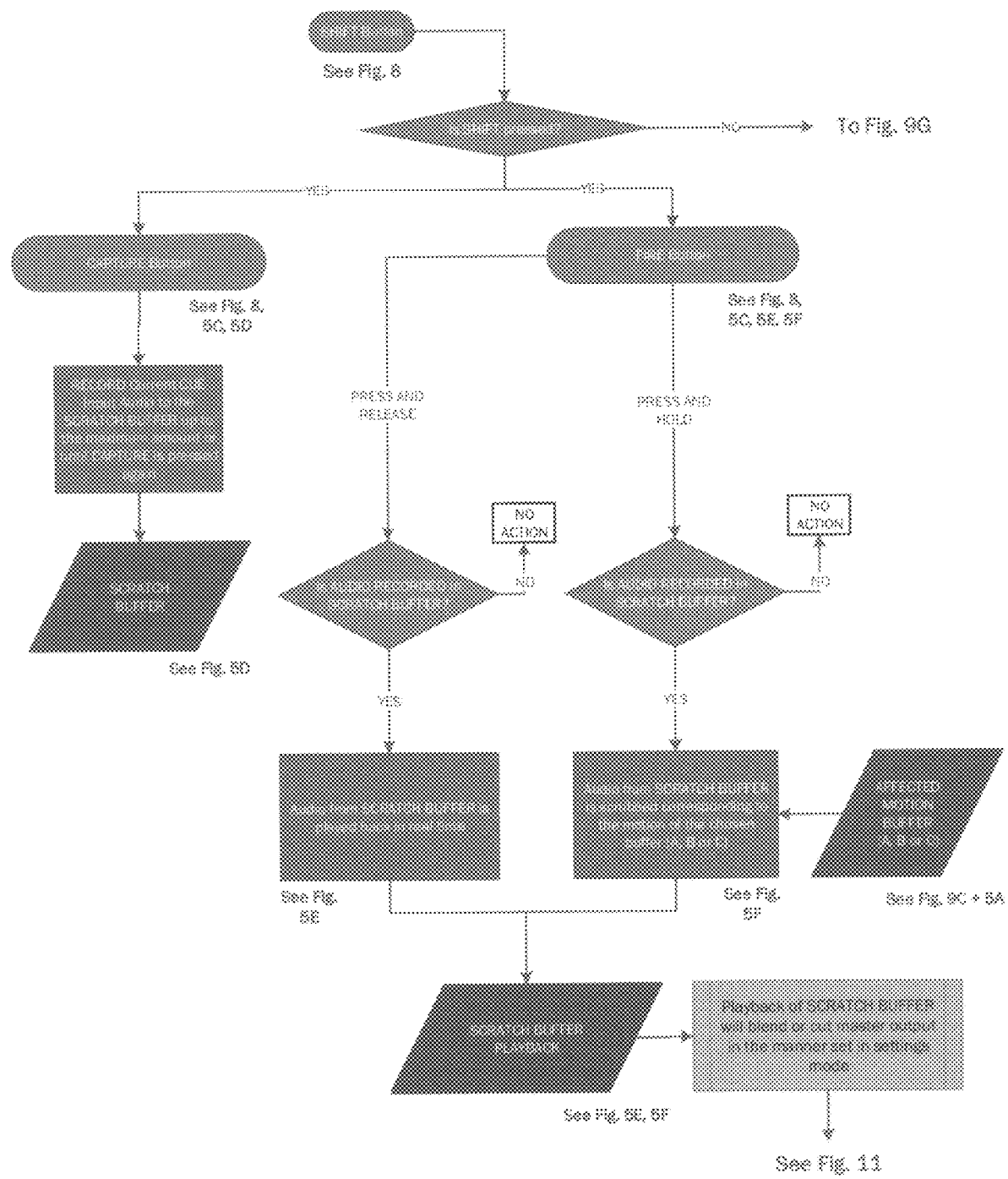
FIG. 9G shows an example of audio sample capture and fire operations.

FIG. 9G shows an example of audio sample capture and fire operations 900G.

Figure 10:
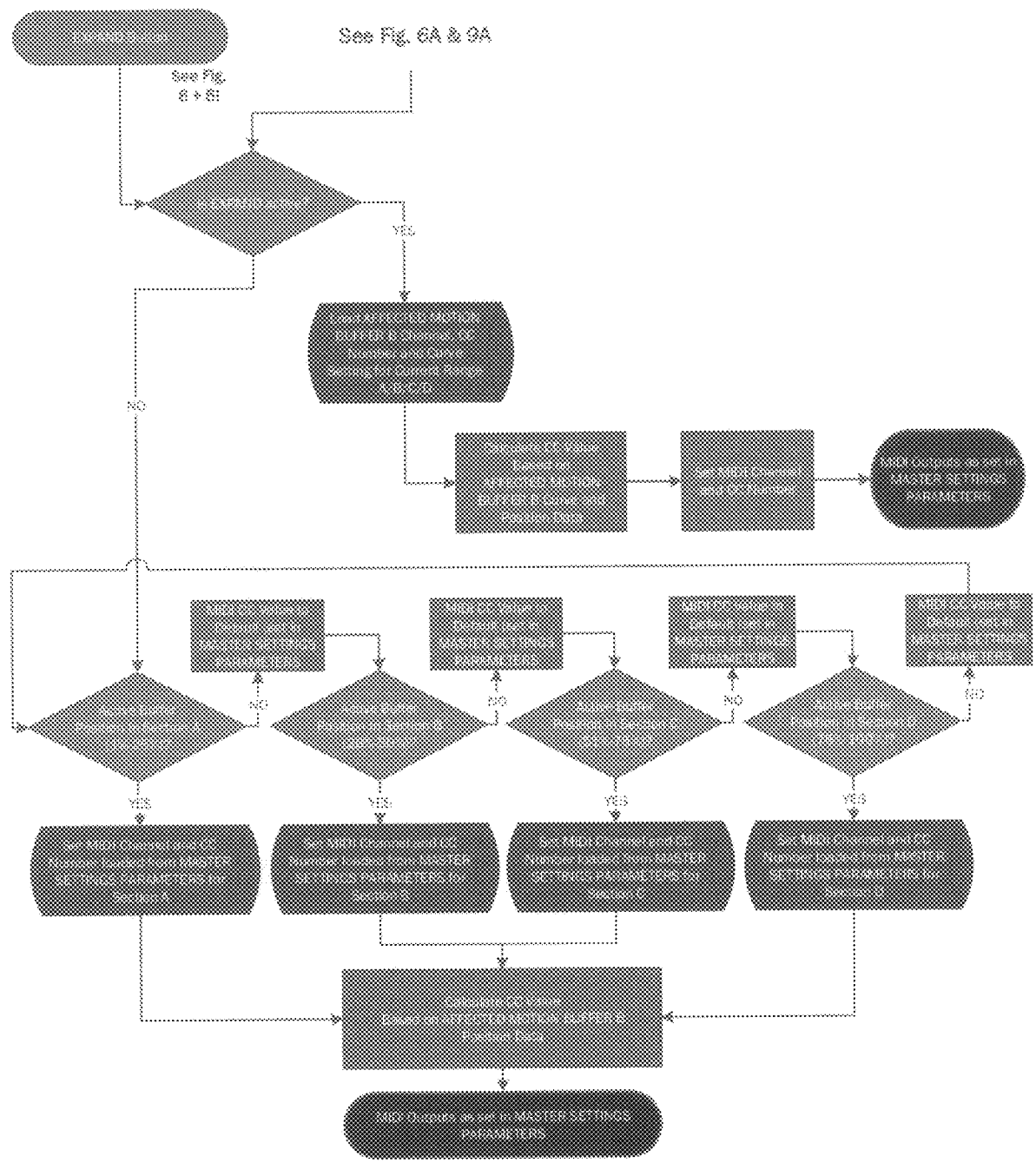
FIG. 10 shows exemplary MIDI output(s).

FIG. 10 shows exemplary MIDI output(s) where an expand function may be active or not, the MIDI outputs being a part of the master settings parameters 1000.

Figure 11:
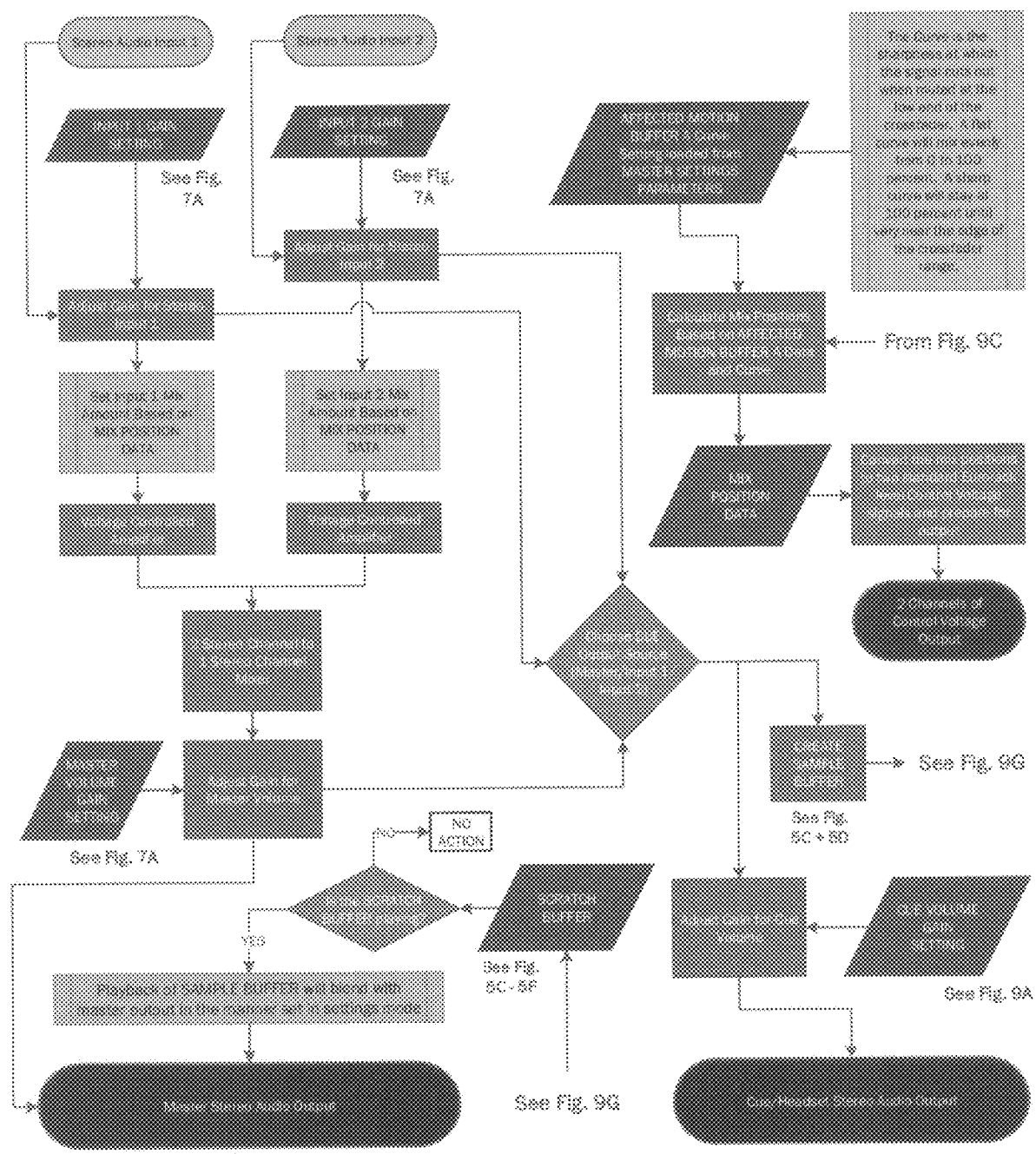
FIG. 11 shows an embodiment of voltage controlled mixer.

FIG. 11 shows an embodiment of the voltage controlled mixer with audio inputs processed and resulting in a master stereo audio output and a cue/headset stereo audio output as well as two channels of control voltage output 1100.

Figure 12:
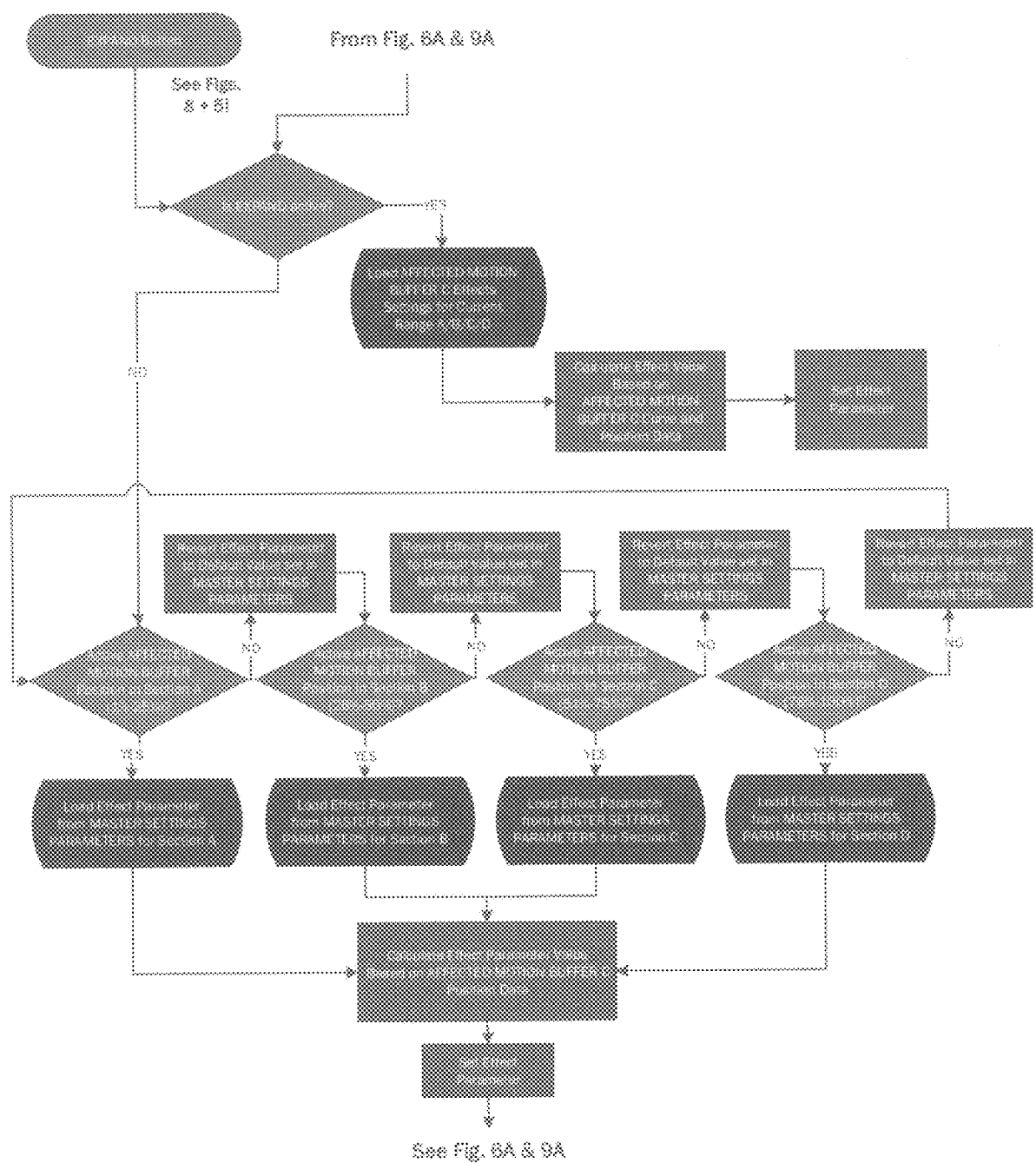
FIG. 12 shows exemplary audio effects processor controls.

FIG. 12 shows exemplary audio effects processor controls where an expand function may be active or not, the effects processor controls being a part of master settings parameters 1200.

While various embodiments of the present invention have been described above, it should be understood that they have been presented by way of example only, and not limitation. It will be apparent to skilled artisans that various changes in the form and details can be made without departing from the spirit and scope of the invention. As such, the breadth and scope of the present invention should not be limited by the above-described examples, but should be defined only in accordance with the following claims and equivalents thereof.

What is claimed is:

1. A fade device comprising:
a crossfader with a slider control, a mixer and the crossfader coupled together via a processor;
a rotary control connected to the processor;
a first direction of rotary control movement for applying latency to a slider signal where the application of latency creates a latent slider signal that is delayed in time;
a second direction of rotary control movement for applying acceleration to the slider signal where the application of acceleration creates an accelerated slider signal that is a prediction of future slider movement;
the mixer for receiving a first analog audio input, a second analog audio input, and one of a) the latent slider signal or b) the accelerated slider signal; and,
a mixer output for combining an audio signal derived from the first audio input and an audio signal derived from the second audio input;
wherein a gain of at least one of the derived signals is delayed or accelerated by action of the rotary control.

2. A fade device comprising:
a crossfader and mixer interconnected via a processor;
a crossfader slider control for generating slider signals indicative of actual slider positions;
a rotary control connected to the processor;
a first direction of rotary control movement for creating delayed slider position signals;
a second direction of rotary control movement for creating predicted future slider position signals;
a mixer for receiving a first analog audio input, a second analog audio input, and one of a) the delayed slider position signal or b) the predicted future slider position signal; and,
a mixer output for combining an audio signal derived from the first audio input and an audio signal derived from the second audio input;
wherein the gain of at least one of the derived signals is controlled by the delayed slider position signal or the predicted future slider position signal.

3. The fade device of claim 2 further comprising:
a processor main motion buffer;
main motion buffer content indicating a sequence of actual slider positions and the times therebetween; and,
third derivatives of position versus time used in the prediction of future slider position.

4. The fade device of claim 3 further comprising:
a delayed slider position buffer; and,
the delayed slider position buffer containing position versus time information based on a delayed recording of the actual slider position versus time.

5. The fade device of claim 4 wherein:
the delayed slider position buffer is used to control multiple sets of MIDI output parameters within subdivisions of a maximum range available according to settings contained within the processor.

6. The fade device of claim 4 wherein:
the delayed slider position buffer is used to control multiple sets of parameters of a digital audio processor within subdivisions of a maximum range available according to settings contained within the processor.

7. The fade device of claim 4 wherein:
the delayed slider position buffer is used to produce a control voltage output according to settings contained within the processor.

8. The fade device of claim 4 wherein:
the delayed slider position buffer is used to control the gain of at least one of the derived signals.

9. The fade device of claim 3 further comprising:
a future slider position buffer; and,
the future slider position buffer containing position versus time information based on a predicted version of slider position.

10. The fade device of claim 9 wherein:
the future slider position buffer is used to control multiple sets of MIDI output parameters within subdivisions of a maximum range available according to settings contained within the processor.

11. The fade device of claim 9 wherein:
the future slider position buffer is used to control multiple sets of parameters of a digital audio processor within subdivisions of a maximum range available according to settings contained within the processor.

12. The fade device of claim 9 wherein:
the future slider position buffer is used to produce a control voltage output according to settings contained within the processor.

13. The fade device of claim 9 wherein:
the future slider position buffer is used to control the gain of at least one of the derived signals.

14. A fade device for making a transition from a first audio source to a second audio source comprising:
a digital processor interconnecting a crossfader and a first mixer;
first mixer inputs derived from the first and second audio sources;
a first mix that is a combination of the first and second audio sources determined by a processor signal derived from the crossfader;
a cued audio signal derived from the first or the second audio source;
a modulated cued audio signal that is the cued audio signal after modulation by an accelerated crossfader signal that is a prediction of future slider movement; and,
a second mixer output that is a combination of the first mix and the modulated cued audio signal.

15. A fade device for making a transition from a first audio source to a second audio source comprising:
a digital processor interconnecting a crossfader and a first mixer;
first and second audio source outputs processed in first and second voltage controlled amplifiers, at least one amplifier controlled by an acceleration signal;
the acceleration signal based on predictions of future positions of a crossfader slider control;
cued audio from one of the first audio source, the second audio source, or an output of the first mixer;
the cued audio source modulated via a latent or an accelerated version of the crossfader slider control positions; and,
a fade device output from a second mixer that combines the modulated cued audio and a first mixer output of combined signals derived from the first and second voltage controlled amplifier outputs.

16. The fade device of claim 15 further comprising:

a modulator, the cued audio source modulated by the modulator;

the modulation source providing an indication of time versus playhead positions;

the time versus playhead positions indicating what portions of the cued audio will be included in the modulated cued audio; and, the time versus playhead positions indicating the order in which the included portions will be arranged.

\* \* \* \* \*